(12) United States Patent
Ushiki et al.

(10) Patent No.: US 10,616,712 B2
(45) Date of Patent: Apr. 7, 2020

(54) CONTROL METHOD, CONTROL APPARATUS, AND RECORDING MEDIUM FOR SETTING SERVICE PROVIDING AREAS

(71) Applicant: FUJITSU LIMITED, Kawasaki-shi, Kanagawa (JP)

(72) Inventors: Kazumasa Ushiki, Kawasaki (JP); Naruhiro Kusumine, Kawasaki (JP); Akira Fujii, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/217,860

(22) Filed: Dec. 12, 2018

(65) Prior Publication Data
US 2019/0191271 A1 Jun. 20, 2019

(30) Foreign Application Priority Data
Dec. 20, 2017 (JP) .................. 2017-244307

(51) Int. Cl.
*H04W 48/12* (2009.01)
*H04W 76/14* (2018.01)
*H04W 4/021* (2018.01)
*H04W 4/50* (2018.01)

(52) U.S. Cl.
CPC ............. *H04W 4/021* (2013.01); *H04W 4/50* (2018.02)

(58) Field of Classification Search
CPC ... H04W 4/021; H04W 4/50; H04W 52/0254; H04W 48/12; H04W 8/205; H04W 76/14; H04M 3/42136; H04M 11/08

USPC .......... 455/66.1, 456.1, 456.6; 370/252, 328, 370/338
See application file for complete search history.

(56) References Cited

U.S. PATENT DOCUMENTS

| | | | | |
|---|---|---|---|---|
| 5,732,326 A * | 3/1998 | Maruyama | ............. | H04M 11/08 455/66.1 |
| 7,136,657 B2 * | 11/2006 | Takayama | ......... | H04M 3/42136 455/456.1 |
| 7,506,261 B2 * | 3/2009 | Satou | ..................... | G09G 5/005 345/2.1 |
| 8,239,431 B2 * | 8/2012 | Nomura | ................... | H04L 51/38 708/206 |

(Continued)

FOREIGN PATENT DOCUMENTS

| | | |
|---|---|---|
| JP | 2014-520341 | 8/2014 |
| JP | 2016-521946 | 7/2016 |
| JP | 2016-528564 | 9/2016 |

*Primary Examiner* — William D Cumming
(74) *Attorney, Agent, or Firm* — Fujitsu Patent Center

(57) ABSTRACT

The method for setting service providing areas is provided. The method generates first area information according to a position of the computer at a first time. The method also selects second area information based on the position. The second area information is less than a maximum number of a monitoring target areas set to an OS by the number of the first area information or more. The method also sets the first and second area information. When receiving a first notification indicating that the position has entered or has left the area indicated by the first area information from the OS, the method also newly generates the first area information according to a position of the computer at a second time when the first notification is received. The method also resets the new first and second area information as new monitoring target areas of the OS.

14 Claims, 27 Drawing Sheets

(56) References Cited

U.S. PATENT DOCUMENTS

| | | | | |
|---|---|---|---|---|
| 8,655,358 | B2* | 2/2014 | Nakahama | H04W 4/021 370/338 |
| 8,718,683 | B2* | 5/2014 | Hamano | H04W 4/021 455/456.6 |
| 8,811,204 | B2* | 8/2014 | Higuchi | H04L 5/006 370/252 |
| 8,929,684 | B2* | 1/2015 | Takei | G06F 16/00 382/282 |
| 8,965,397 | B2* | 2/2015 | Nitta | H04W 4/021 370/328 |
| 9,167,387 | B2* | 10/2015 | Akiyama | H04L 12/1435 |
| 9,253,625 | B2* | 2/2016 | Hayashida | H04W 4/50 |
| 9,351,255 | B2* | 5/2016 | Nakao | H04W 52/0254 |
| 9,363,737 | B2* | 6/2016 | Tanaka | H04W 48/12 |
| 9,445,350 | B2* | 9/2016 | Jimbo | H04W 48/04 |
| 9,473,874 | B2* | 10/2016 | Noda | H04W 8/205 |
| 9,860,696 | B2* | 1/2018 | Watanabe | H04W 4/50 |
| 9,974,106 | B2* | 5/2018 | Shiizaki | H04W 4/021 |
| 10,104,505 | B2* | 10/2018 | Gallegos | H04W 64/00 |
| 10,264,087 | B2* | 4/2019 | Kenjo | H04W 64/003 |
| 2005/0091607 | A1* | 4/2005 | Satou | G09G 5/005 715/788 |
| 2009/0164909 | A1* | 6/2009 | Satou | G09G 5/005 715/740 |
| 2011/0134788 | A1* | 6/2011 | Higuchi | H04L 5/006 370/252 |
| 2013/0030915 | A1 | 1/2013 | Statler et al. | |
| 2014/0115513 | A1* | 4/2014 | Tan | G06F 17/245 715/769 |
| 2014/0370911 | A1 | 12/2014 | Gorgenyi et al. | |
| 2015/0005012 | A1 | 1/2015 | Wang et al. | |
| 2015/0244991 | A1* | 8/2015 | Noda | H04N 7/181 348/158 |
| 2015/0363076 | A1* | 12/2015 | Komatsu | G06T 19/006 715/765 |
| 2016/0048298 | A1* | 2/2016 | Choi | G06F 3/04842 715/846 |
| 2017/0052709 | A1* | 2/2017 | Kawamura | G06F 3/065 |
| 2018/0253597 | A1* | 9/2018 | Kozakaya | G08B 13/196 |
| 2018/0267737 | A1* | 9/2018 | Oe | G06F 3/0647 |
| 2019/0191271 | A1* | 6/2019 | Ushiki | H04W 4/021 |

* cited by examiner

| | OFFERING DISTRICT: DISTRICT B | | | | |
|---|---|---|---|---|---|
| | OFFERING DISTRICT: DISTRICT A | | | | |
| | GEO-FENCE ID | GEO-FENCE NAME | LATITUDE | LONGITUDE | RADIUS |
| GEO-FENCE DEFINITION INFORMATION | a001 | place1 | $x_1$ | $y_1$ | $r_1$ |
| | a002 | place2 | $x_2$ | $y_2$ | $r_2$ |
| | a003 | place3 | $x_3$ | $y_3$ | $r_3$ |
| | ... | ... | ... | ... | ... |

| GEO-FENCE ID | GEO-FENCE NAME | SERVICE APPLICATION |
|---|---|---|
| a001 | SERVICE APPLICATION 1 | ... |
| a002 | SERVICE APPLICATION 2 | ... |
| a003 | SERVICE APPLICATION 3 | ... |
| ... | ... | ... |

FIG. 9

| | GEO-FENCE ID | GEO-FENCE NAME | LATITUDE | LONGITUDE | RADIUS |
|---|---|---|---|---|---|
| GEO-FENCE DEFINITION INFORMATION | a001 | place1 | $x_1$ | $y_1$ | $r_1$ |
| | a002 | place2 | $x_2$ | $y_2$ | $r_2$ |
| | a003 | place3 | $x_3$ | $y_3$ | $r_3$ |
| | ... | ... | ... | ... | ... |

FIG. 11

| | GEO-FENCE ID | GEO-FENCE NAME | LATITUDE | LONGITUDE | RADIUS |
|---|---|---|---|---|---|
| GEO-FENCE DEFINITION INFORMATION | a001 | place1 | $x_1$ | $y_1$ | $r_1$ |
| | a002 | place2 | $x_2$ | $y_2$ | $r_2$ |
| | a003 | place3 | $x_3$ | $y_3$ | $r_3$ |
| | ... | ... | ... | ... | ... |
| | a019 | place19 | $x_{19}$ | $y_{19}$ | $r_{19}$ |
| | c000 | place000 | $x_0$ | $y_0$ | $r_0$ |

CONTROL METHOD, CONTROL APPARATUS, AND RECORDING MEDIUM FOR SETTING SERVICE PROVIDING AREAS

CROSS-REFERENCE TO RELATED APPLICATION

This application is based upon and claims the benefit of priority of the prior Japanese Patent Application No. 2017-244307, filed on Dec. 20, 2017, the entire contents of which are incorporated herein by reference.

FIELD

The embodiments discussed herein are related to a control program, a control method, and a control apparatus.

BACKGROUND

There has been known an application that utilizes positional information about a terminal device, which is received by a global positioning system (GPS) receiver or the like, to determine whether the user of the terminal device has entered one or more predetermined areas (service providing areas) or has left the service providing areas. For example, when the user has entered the certain service providing area, such application offers a service corresponding to the service providing area.

An operating system (OS) having a geo-fence function has been also known. The geo-fence function enables the OS to determine whether the user has entered an area set as a monitoring target (this area is referred to as "geofence") or has left the area. Related arts are disclosed in, for example, Japanese National Publication of International Patent Application Nos. 2016-528564, 2014-520341, and 2016-521946.

An application may set the service providing area as the monitoring target to the OS. Thereby, for example, the application may receive a notification that the user has entered the service providing area from the OS, and offers a service corresponding to the service providing area.

However, in the geo-fence function, the maximum number of the areas that may be set as the monitoring targets is predefined for each OS. For this reason, the application may not set the service providing areas exceeding the maximum number of service providing areas to the OS. For example, if the maximum number of areas that may be set as the monitoring targets is "20", the application may not set the 21 service providing areas or more to the OS.

Thus, if the service providing areas exceeding the maximum number of service providing areas that may be set to the OS are present, the application may not set all of the service providing areas as the monitoring targets to the OS. In this case, even if the user has entered the service providing area that is not set to the OS, the user may not receive the service corresponding to the service providing area concerned. Therefore, to offer the service providing area concerned, the application is required to change the areas set to the OS as the monitoring targets. In consideration of such circumstances, in using the geo-fence function on the side of the OS, it is desirable to be capable of controlling a timing at which the areas set to the OS as the monitoring targets are changed.

SUMMARY

According to an aspect of the embodiments, a non-transitory computer-readable storage medium storing a program that causes a computer having an OS for monitoring entry into or leaving from a monitoring target area to execute a process, the process includes generating first area information according to a position of the computer at a first time; selecting second area information from among a plurality of predefined candidate area information based on the position of the computer at the first time, the second area information being less than a maximum number of the monitoring target areas set to the OS by the number of the first area information or more; setting the first area information and the second area information as the monitoring target areas to the OS; when receiving a first notification indicating that the position of the computer has entered or has left the area indicated by the first area information from the OS, newly generating the first area information according to a position of the computer at a second time when the first notification is received; selecting new second area information from among the plurality of candidate area information based on a position of the computer at the second time; and resetting the new first area information and the new second area information as new monitoring target areas of the OS.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a view illustrating an example of a geo-fence definition DB;

FIG. 7 is a view illustrating an example of a service application DB;

FIG. 9 is a view illustrating an example of an application-side geo-fence definition table;

FIG. 11 is a view illustrating an example of an OS-side geo-fence definition table;

DESCRIPTION OF EMBODIMENTS

Embodiments of the present disclosure will be described below with reference to appended figures. When the user has entered a predetermined area (service providing area), a service offering system 1 described below offers a service corresponding to the area concerned.

(First Embodiment)

Figure 1:
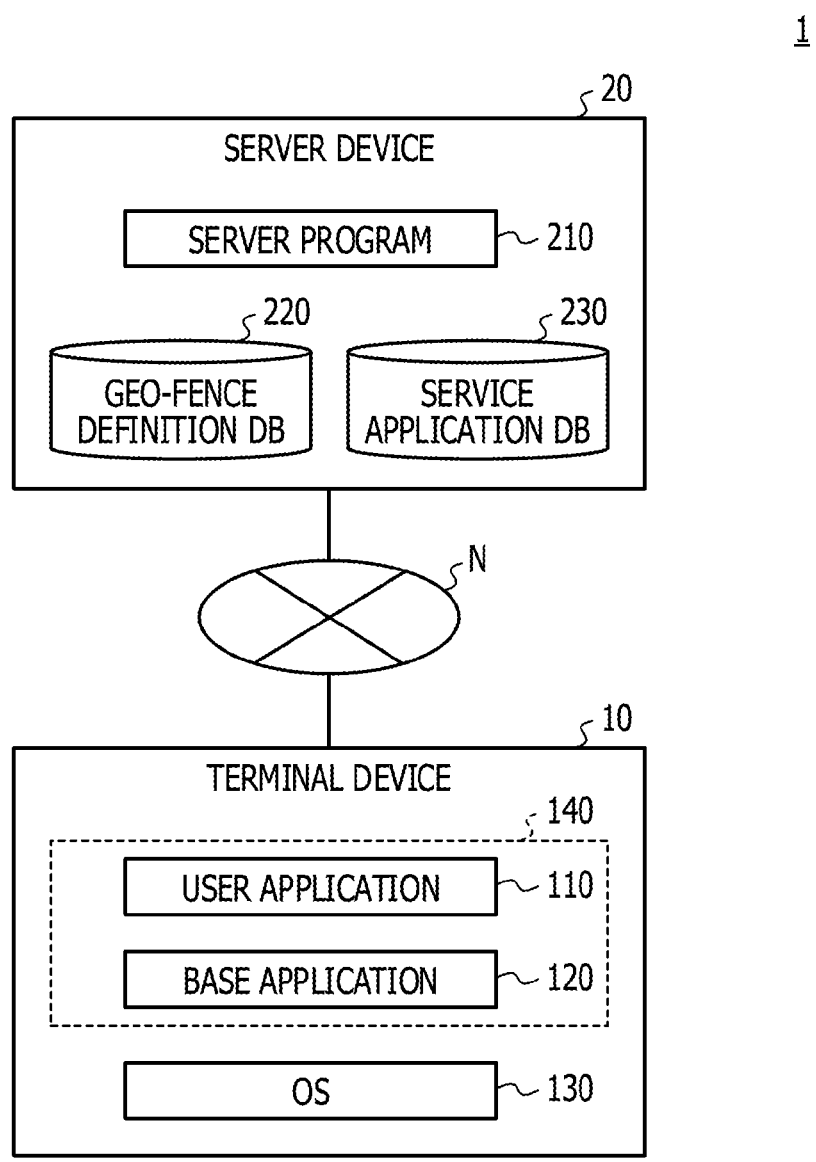
FIG. 1 is a view of an example of an entire configuration of a service offering system according to a first embodiment.

First, an entire configuration of the service offering system 1 according to the present embodiment is described below with reference to FIG. 1. FIG. 1 is a view illustrating an example of the entire configuration of the service offering system 1 according to the first embodiment.

As illustrated in FIG. 1, the service offering system 1 according to the present embodiment includes a terminal device 10 and a server device 20. The terminal device 10 is communicably connected to the server device 20 via a network N such as the Internet.

The terminal device 10 is a portable information processing terminal held by the user, such as a smart phone or a tablet terminal. The terminal device 10 determines whether the user has entered a predetermined area or has left the predetermined area. Then, if the terminal device 10 determines that the user has entered the predetermined area, the terminal device 10 offers a service corresponding to the area concerned to the user. On the contrary, if the terminal device 10 determines that the user has left the predetermined area, the terminal device 10 finishes offering of the service corresponding to the area concerned. Entry of the user into the area is also referred to as "check-in". Leaving of the user from the area is also referred to as "check-out".

The terminal device 10 installs a user application 110, a base application 120 and an OS 130 therein. The user application 110 is an application program used by the user.

The base application 120 is an application program that functions as a base of the user application 110. The base application 120 sets and resets areas to be monitored using the geo-fence function of the OS 130 (that is, areas to be monitored) to the OS 130. The user application 110 and the base application 120 may configure one application 140.

The OS 130 is an operating system having the geo-fence function. Examples of the OS 130 include iOS (registered trademark) and Android (registered trademark). Through its geo-fence function, the OS 130 determines whether the user has entered or has left the area set by the base application 120, based on the user's current position measured using a GPS receiver or the like. Then, if the OS 130 determined that the user has entered the area concerned, the OS 130 notifies an event indicating that the user has entered the area concerned to the base application 120. Similarly, if the OS 130 determines that the user has left the area concerned, the OS 130 notifies an event indicating that the user has left the area concerned to the base application 120. Hereinafter, the area set to the OS 130 is also referred to as "geo-fence".

Examples of the terminal device 10 are not limited to a smart phone and a tablet terminal. The terminal device 10 may be a portable gaming equipment, a music player, a wearable device, an on-vehicle equipment, or the like. That is, various portable information processors (computers) that may be held by the user or may be mounted in movable vehicles (automobiles, motorcycles, bicycles, and so on) are available as the terminal device 10.

The server device 20 is an information processing apparatus or an information processing system that offers geo-fence definition information defining a predetermined area (geo-fence), and a service application implementing a service to the terminal device 10.

The server device 20 installs a server program 210 therein. The server device 20 includes a geo-fence definition DB 220 and a service application DB 230.

In response to a request from the terminal device 10, the server device 20 transmits the geo-fence definition information stored in the geo-fence definition DB 220 to the terminal device 10. In response to a request from the terminal device 10, the server device 20 transmits the service application corresponding to the geo-fence that the user has entered among service applications stored in the service application DB 230, to the terminal device 10. Details of the geo-fence definition DB 220 and the service application DB 230 will be described later.

The service application is transmitted to the terminal device 10, such that in the terminal device 10, the service implemented by the related service application is offered to the user. Examples of such service include a service of offering tourist information about the geo-fence that the user has entered, and a service of providing coupons available in shops in the geo-fence that the user has entered. However, services offered to the user are not limited to these. For example, other various services suitable for the geo-fence that the user has entered may be offered.

Figure 2:
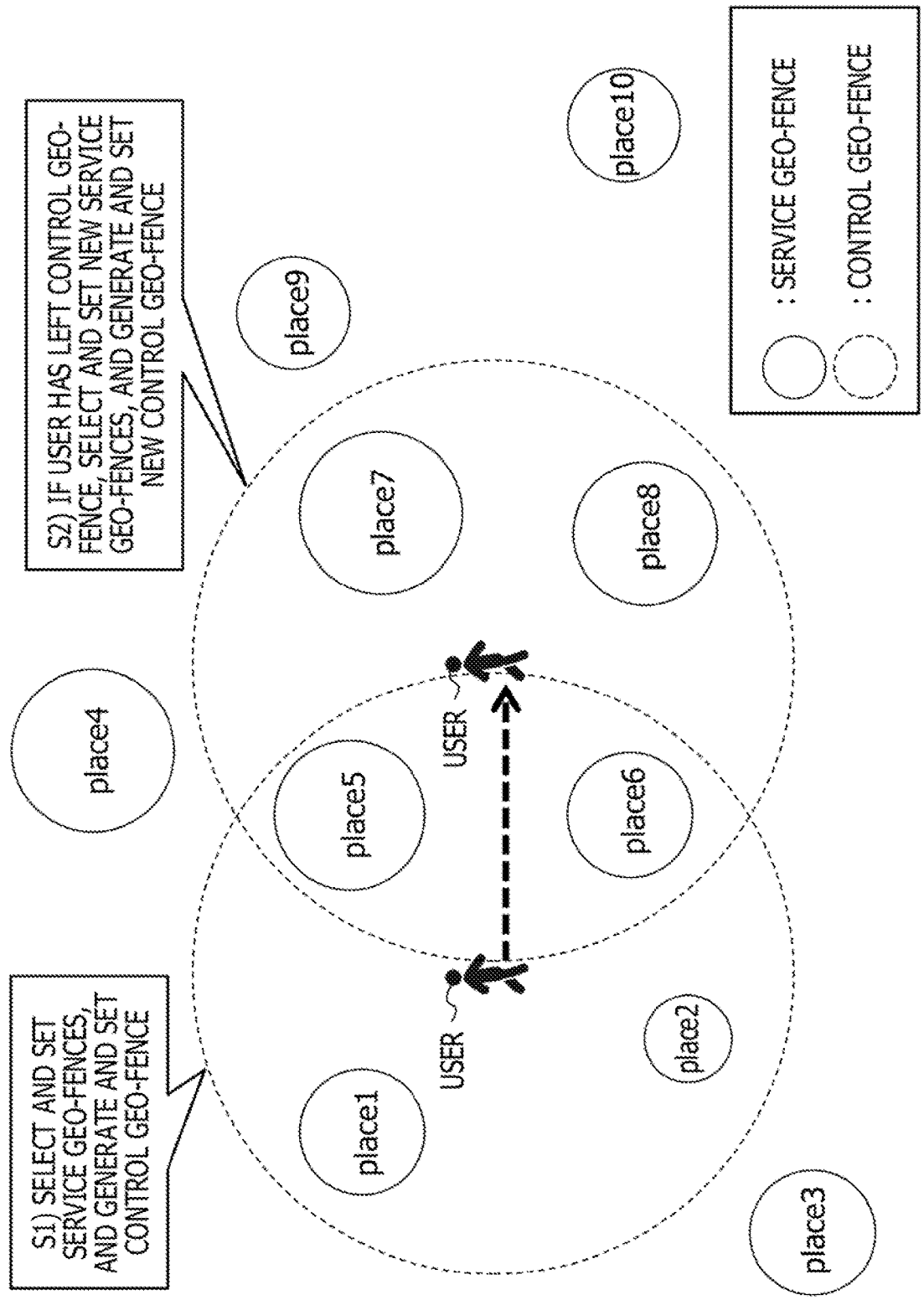
FIG. 2 is a view for describing an example of resetting of geo-fences.

Here, the case of changing the geo-fences that the base application 120 sets as the monitoring targets to the OS 130 (that is, the case of resetting the geo-fences to be monitored to the OS 130) is described with reference to FIG. 2. FIG. 2 is a view for describing an example of resetting of the geo-fences. Hereinafter, the geo-fence that offers a service when the user has entered there is referred to as "service geo-fence". On the other hand, according to the present embodiment, the geo-fence (control geo-fence) generated according to the current position of the terminal device 10 (computer) is an area generated so as to include the current position of the terminal device 10. For example, a circular area having a predetermined radius about the current position of the terminal device 10 is set as the control geo-fence.

In FIG. 2, as an example, the maximum number M of the geo-fences that may be set to the OS 130 is defined as "5". As illustrated in FIG. 2, 10 service geo-fences including "place 1" to "place 10" are present.

S1) The terminal device 10 selects four (=M−1) service geo-fences in the order of proximity to the user's current position (that is, in the order of proximity the current position of the terminal device 10), and sets the selected service geo-fences to the OS 130. In the example illustrated in FIG. 2, four service geo-fences of "place 1", "place 2", "place 5", and "place 6" are selected and set.

The terminal device 10 generates the control geo-fence representing a circular area having a predetermined radius about the user's current position, and sets the control geo-fence to the OS 130. Thereby, M−1 selected service geo-fences and one control geo-fence are set as the monitoring targets to the OS 130.

S2) If the user has moved and left the control geo-fence, the terminal device 10 reselects four (=M−1) service geo-fences in the order of proximity to the current position after movement of the user, and sets the service geo-fences to the OS 130. In the example illustrated in FIG. 2, four service geo-fences including "place 5", "place 6", "place 7", and "place 8" are newly selected and set.

The terminal device 10 newly generates a control geo-fence representing a circular area having a predetermined radius about the current position after movement of the user, and sets the generated control geo-fence to the OS 130. Thereby, M−1 newly selected service geo-fences and one newly generated control geo-fence are set as the monitoring targets to the OS 130.

Thereafter, in the similar manner, if the user has left the control geo-fence, the terminal device 10 newly selects the service geo-fences and sets the service geo-fences to the OS 130, and newly generates the control geo-fence, and sets the control geo-fence to the OS 130.

As described above, if the user has left the control geo-fence (that is, if the terminal device 10 has left the control geo-fence), the terminal device 10 according to the present embodiment resets the service geo-fences and the control geo-fence to the OS 130. Thereby, according to the movement of the user, the terminal device 10 according to the present embodiment may change the service geo-fences set as the monitoring targets to the OS 130, to the service geo-fences located near the user.

Since the control geo-fence is the geo-fence including the user's current position at a particular time, when the user moves from the position, an event of leaving from the geo-fence naturally occurs. Thereby, the application 140 (the base application 120) may receive a notification from the OS 130, and reselect and reset the service geo-fences. That is, by introducing the control geo-fence that forcibly generates the event of leaving from the geo-fence, when the user has left the control geo-fence, the application 140 (the base application 120) reliably reselects the service geo-fences. This may suppress a following situation: the service geo-fences are not reselected and reset since no event is notified from the OS 130 and therefore, the monitoring targets of the OS 130 are not changed.

Figure 3:
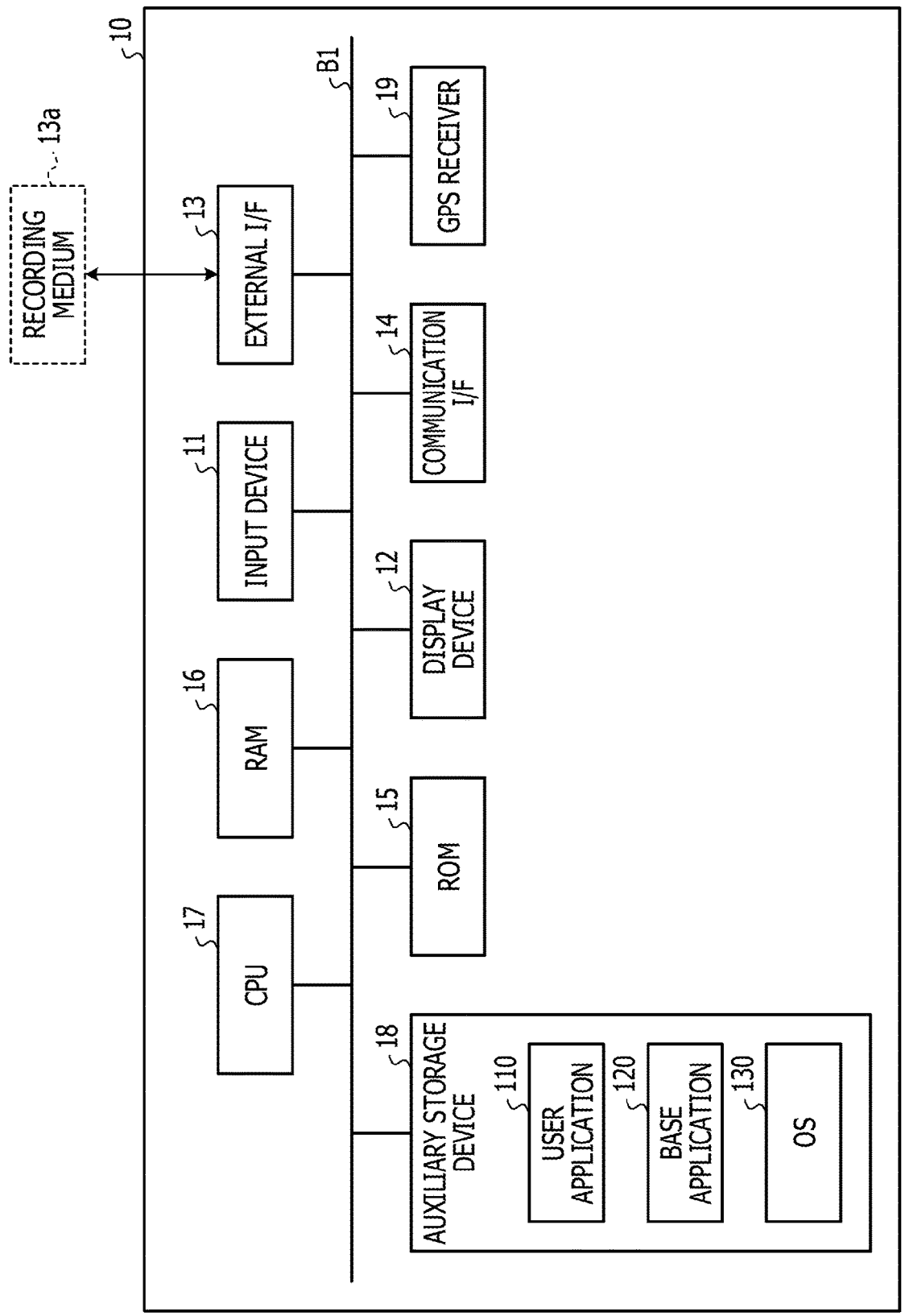
FIG. 3 is a view illustrating an example of a hardware configuration of a terminal device according to the first embodiment.

Next, a hardware configuration of the terminal device 10 according to the present embodiment is described with reference to FIG. 3. FIG. 3 is a view illustrating an example of the hardware configuration of the terminal device 10 according to the first embodiment.

As illustrated in FIG. 3, the terminal device 10 according to the present embodiment includes an input device 11, a display device 12, an external I/F 13, a communication I/F 14, and a read only memory (ROM) 15. The terminal device 10 according to the present embodiment further includes a random access memory (RAM) 16, a central processing unit (CPU) 17, an auxiliary storage device 18, and a GPS receiver 19. These hardware components are interconnected via a bus B1.

The input device 11 is, for example, a touch panel, and is used to input various operations to the terminal device 10. The display device 12 is, for example, a display, and displays results of various processing of the terminal device 10.

The external I/F 13 is an interface with an external device. Examples of the external device include a recording medium 13*a*. The terminal device 10 may perform reading and writing with respect to the recording medium 13*a* via the external I/F 13. Examples of the recording medium 13*a* include an SD memory card and a Universal Serial Bus (USB) memory.

The communication I/F 14 is an interface for connecting the terminal device 10 to the network N. The terminal device 10 may communicate with the server device 20 via the communication I/F 14.

The ROM 15 is a non-volatile semiconductor memory capable of holding data even when power is turned off. The RAM 16 is a non-volatile semiconductor memory for temporarily holding programs and data. The CPU 17 is an arithmetic device for reading programs or data from the auxiliary storage device 18, the ROM 15, or the like onto the RAM 16, and executing various processing.

The auxiliary storage device 18 is a non-volatile semiconductor memory for storing programs and data. The auxiliary storage device 18 stores, for example, the user application 110, the base application 120, and the OS 130. The GPS receiver 19 receives predetermined waves from the GPS to measure the current position of the terminal device 10.

The terminal device 10 according to the present embodiment has the hardware configuration illustrated in FIG. 3 to implement various processing described later.

Figure 4:
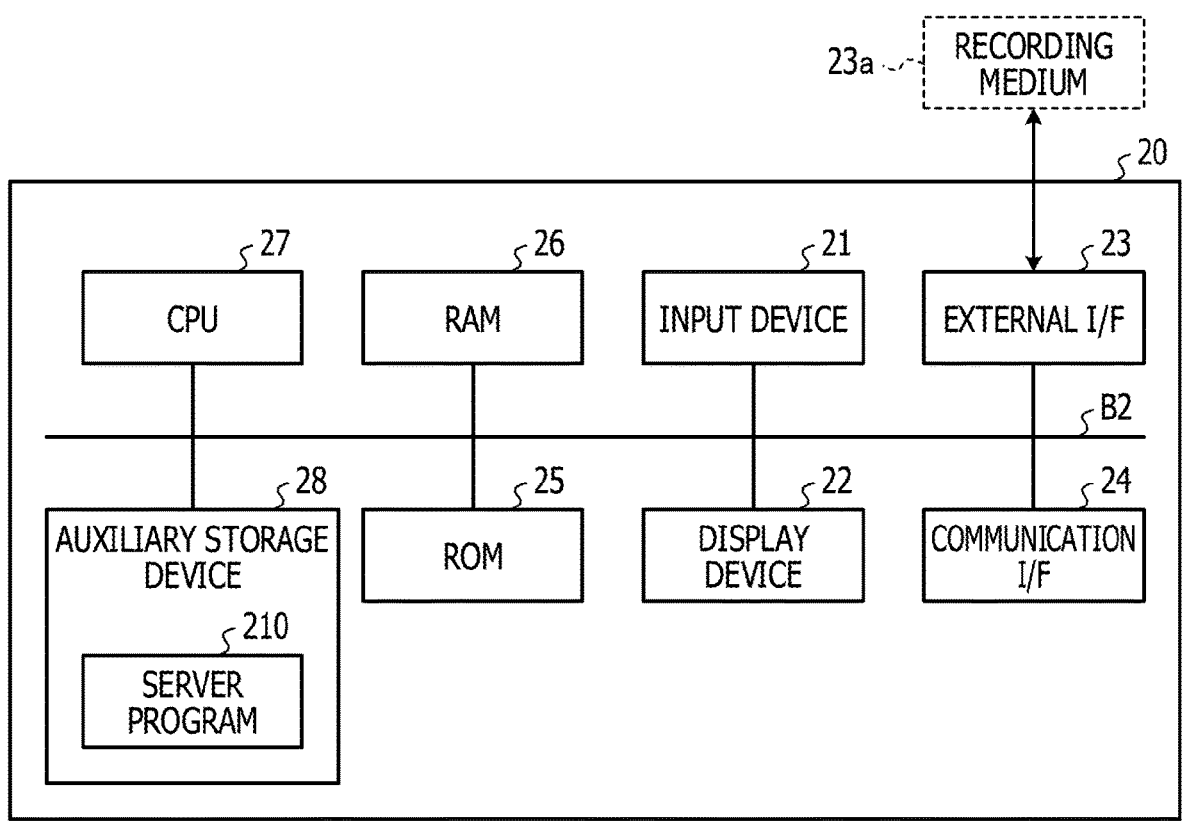
FIG. 4 is a view illustrating an example of a hardware configuration of a server device according to the first embodiment.

Next, a hardware configuration of the server device 20 according to the present embodiment is described with reference to FIG. 4. FIG. 4 is a view illustrating an example of the hardware configuration of the server device 20 according to the first embodiment.

As illustrated in FIG. 4, the server device 20 according to the present embodiment includes an input device 21, a display device 22, an external I/F 23, and a communication I/F 24. The server device 20 according to the present embodiment further includes a ROM 25, a RAM 26, a CPU 27, and an auxiliary storage device 28. These hardware components are interconnected via a bus B2.

The input device 21 is a keyboard, a mouse, or a touch panel, and is used to perform various operations to the server device 20. The display device 22 is, for example, a display, and serves to display various results of processing of the server device 20. The server device 20 may omit at least one of the input device 21 and the display device 22.

The external I/F 23 is an interface with an external device. Examples of the external device include a recording medium 23*a*. The server device 20 may perform reading and writing with respect to the recording medium 23*a* via the external I/F 23. Examples of the recording medium 23*a* include an SD memory card, a USB memory, a compact disc (CD), and a digital versatile disc (DVD).

The communication I/F 24 is an interface for connecting the server device 20 to the network N. The server device 20 may communicate with the terminal device 10 via the communication I/F 24.

The ROM 25 is a non-volatile semiconductor memory capable of holding data even when power is turned off. The RAM 26 is a non-volatile semiconductor memory for temporarily holding programs and data. The CPU 27 is an arithmetic device for reading programs or data from the auxiliary storage device 28, the ROM 25, or the like onto the RAM 26, and executing various processing.

The auxiliary storage device 28 is a non-volatile memory for storing programs and data, such as a hard disk drive (HDD) or a solid state drive (SSD). The auxiliary storage device 28 stores the server program 210, for example.

The server device 20 according to the present embodiment has the hardware configuration illustrated in FIG. 4 to implement various processing described later.

Figure 5:
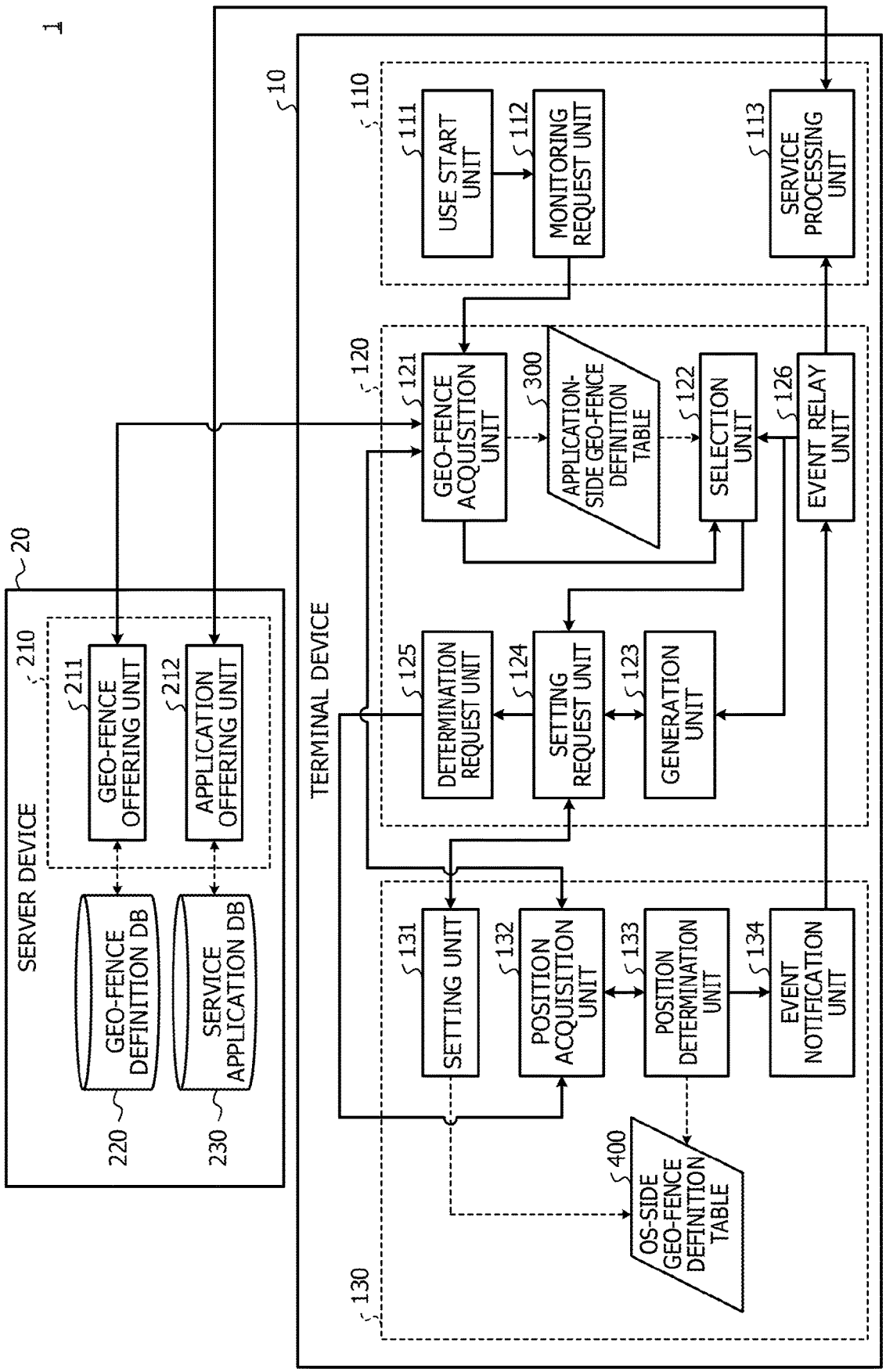
FIG. 5 is a view illustrating an example of a functional configuration of the service offering system according to the first embodiment.

Next, a functional configuration of the service offering system 1 according to the present embodiment is described with reference to FIG. 5. FIG. 5 is a view illustrating an example of the functional configuration of the service offering system 1 according to the first embodiment.

As illustrated in FIG. 5, the terminal device 10 according to the present embodiment includes a use start unit 111, a monitoring request unit 112, and a service processing unit 113. The user application 110 causes the CPU 17 to execute processing so as to implement each of these units.

The terminal device 10 according to the present embodiment further includes a geo-fence acquisition unit 121, a selection unit 122, a generation unit 123, a setting request unit 124, a determination request unit 125, and an event relay unit 126. The base application 120 causes the CPU 17 to execute processing so as to implement each of these units.

The terminal device 10 according to the present embodiment further includes a setting unit 131, a position acquisition unit 132, a position determination unit 133, and an event notification unit 134. The OS 130 causes the CPU 17 to execute processing to implement each of these units.

The use start unit 111 accepts a use start event of the user application 110. Examples of the use start event of the user application 110 include a use start operation on a use start screen displayed by the user application 110, and a predetermined event in processing of activating the user application 110.

If the use start unit 111 accepts the use start event, the monitoring request unit 112 requests the base application 120 to monitor the geo-fences. Monitoring the geo-fences means determining whether the user has entered the geo-fence or has left the geo-fence.

If an event indicating that the user has entered the geo-fence (in-event) or an event indicating that the user has left the geo-fence (exit-event) is notified from the base application 120, the service processing unit 113 executes processing corresponding to the event.

For example, if the event indicating that the user has entered the geo-fence (in-event) is notified, the service processing unit 113 transmits an acquisition request of the service application corresponding to the geo-fence concerned to the server device 20. Thereby, the service application implementing the service corresponding to the geo-fence that the user has entered is acquired from the server device 20.

On the contrary, for example, if the event indicating that the user has left the geo-fence (exit-event) is notified, the service processing unit 113 deletes the service application corresponding to the geo-fence concerned from the terminal device 10.

If the monitoring request unit 112 requests monitoring of the geo-fences, the geo-fence acquisition unit 121 transmits an acquisition request of the geo-fence definition information to the server device 20. At this time, for example, the geo-fence acquisition unit 121 transmits the acquisition request including positional information (that is, positional information indicating the current position of the user using the terminal device 10) acquired by the position acquisition unit 132 to the server device 20.

The geo-fence definition information returned from the server device 20 in response to the acquisition request of the geo-fence definition information is stored in an application-side geo-fence definition table 300 by the geo-fence acquisition unit 121. The application-side geo-fence definition table 300 is managed by the base application 120, and stores the geo-fence definition information returned from the server device 20 (that is, geo-fence definition information defining the service geo-fences). The application-side geo-fence definition table 300 is stored in the auxiliary storage device 18, for example. Details of the application-side geo-fence definition table 300 will be described later.

The selection unit 122 selects geo-fence definition information set as the monitoring target to the OS 130 from the geo-fence definition information stored in the application-side geo-fence definition table 300. At this time, the selection unit 122 selects the number of pieces of geo-fence definition information, which is less than the maximum number M of geo-fences that may be set to the OS 130 by the number of control geo-fences L (L=1 in the present embodiment) or more, in the order of proximity of the geo-fences defined by the geo-fence definition information to the user's current position, from the application-side geo-fence definition table 300.

The generation unit 123 generates the geo-fence definition information about the control geo-fence. At this time, for example, the generation unit 123 generates the geo-fence definition information about the control geo-fence representing a circular area having a predetermined radius about the user's current position.

The setting request unit 124 requests the OS 130 to set the geo-fence definition information (geo-fence definition information about the service geo-fences) selected by the selection unit 122. The setting request unit 124 requests the OS 130 to set the geo-fence definition information (geo-fence definition information about the control geo-fence) generated by the generation unit 123.

The determination request unit 125 requests the OS 130 to determine whether the user has entered the geo-fence or has left the geo-fence.

The event relay unit 126 relays the event notified from the OS 130 (the in-event or the exit-event) to the user application 110 and so on. For example, if the in-event into the service geo-fence or the exit-event from the service geo-fence is notified, the event relay unit 126 notifies the in-event or the exit-event to the user application 110.

If the exit-event from the control geo-fence is notified, the event relay unit 126 notifies the exit-event to the selection unit 122 and the generation unit 123. When the exit-event from the control geo-fence is notified to the selection unit 122, the selection unit 122 selects new service geo-fences. Similarly, when the exit-event from the control geo-fence is notified to the generation unit 123, the generation unit 123 generates a new control geo-fence.

On the contrary, if the in-event into the control geo-fence is notified, the event relay unit 126 abandons the in-event. The reason is as follows. When the control geo-fence including the user's current position (for example, the control geo-fence representing a circular area having a predetermined radius about the user's current position) is set to the OS 130, the in-event is generated. However, the notification of the in-event into the control geo-fence is unnecessary for the user application 110 and so on.

In response to a request from the setting request unit 124, the setting unit 131 stores the geo-fence definition information in an OS-side geo-fence definition table 400. The OS-side geo-fence definition table 400 is managed by the OS 130, and stores the geo-fence definition information indicating the geo-fences of the monitoring targets. When the geo-fence definition information is stored in the OS-side geo-fence definition table 400, the geo-fences indicated by the geo-fence definition information are set as the monitoring targets to the OS 130. The OS-side geo-fence definition table 400 is stored in the auxiliary storage device 18, for example. Details of the OS-side geo-fence definition table 400 will be described later.

The position acquisition unit 132 acquires positional information indicating the position measured by the GPS receiver 19 (that is, the current position of the user using the terminal device 10).

Referring to the OS-side geo-fence definition table 400, the position determination unit 133 determines whether the user has entered the geo-fence or has left the geo-fence. That is, the position determination unit 133 determines whether the position (the user's current position) indicated by the positional information acquired by the position acquisition unit 132 has entered the geo-fence or has left the geo-fence.

If the position determination unit 133 determines that the user has entered the geo-fence, the event notification unit 134 notifies the in-event indicating that the user has entered into the geo-fence concerned to the base application 120. If the position determination unit 133 determines that the user has left the geo-fence, the event notification unit 134 notifies the exit-event indicating that the user has left the geo-fence concerned to the base application 120.

As illustrated in FIG. 5, the server device 20 according to the present embodiment includes a geo-fence offering unit 211 and an application offering unit 212. The server program 210 causes the CPU 27 to execute processing so as to implement each of these units.

As described above, the server device 20 according to the present embodiment includes the geo-fence definition DB 220 and the service application DB 230. The DBs each may be embodied as the auxiliary storage device 28. At least one of the DBs may be embodied as a storage device connected to the server device 20 via the network N.

If the geo-fence offering unit 211 receives the acquisition request of the geo-fence definition information, the geo-fence offering unit 211 acquires the geo-fence definition information corresponding to the acquisition request from the geo-fence definition DB 220, and returns the geo-fence definition information to the terminal device 10.

If the application offering unit 212 receives an acquisition request of the service application, the application offering unit 212 acquires the service application corresponding to the acquisition request from the service application DB 230, and returns the service application to the terminal device 10.

The geo-fence definition DB 220 stores the geo-fence definition information indicating service geo-fences defined on a map. Here, the geo-fence definition DB 220 is described with reference to FIG. 6. FIG. 6 is a view illustrating an example of the geo-fence definition DB 220.

As illustrated in FIG. 6, the geo-fence definition DB 220 stores the geo-fence definition information for each offering district. The geo-fence definition DB 220 illustrated in FIG. 6 stores one or more pieces of geo-fence definition information about the offering district "district A", and one or more pieces of geo-fence definition information about "district B". For example, if the position indicated by positional information included in the acquisition request of the geo-fence definition information is included in the district A, the geo-fence offering unit 211 transmits the geo-fence definition information about the offering district "district A" to the terminal device 10. Similarly, for example, if the position indicated by positional information included in the acquisition request of the geo-fence definition information is included in the district B, the geo-fence offering unit 211 transmits the geo-fence definition information about the offering district "district B" to the terminal device 10. In this manner, the geo-fence definition information corresponding to the user's current position at the time when the use start event of the user application 110 is accepted is offered to the terminal device 10.

For example, the districts set as the offering districts are defined as polygonal regions each having a latitude and a longitude on a map as apexes. The polygonal regions represent geographical ranges representing various districts such as prefectures, municipalities, or regions (for example, the Tohoku region, the Kanto region, the Tokai region, or the like).

Each piece of geo-fence definition information includes geo-fence ID, geo-fence name, latitude, longitude, and radius as data items.

The geo-fence ID is identification information for identifying the geo-fence. The geo-fence name is a name of the geo-fence. The latitude and longitude are the latitude and longitude of the center of the geo-fence. The radius is a radius of the geo-fence. Thereby, in the geo-fence definition information, a circular area having a predetermined radius about predetermined latitude and longitude is defined as the geo-fence.

The geo-fence is not limited to the circular area. In the geo-fence definition information, the geo-fence may be defined as an elliptical region, a polygonal region, and various curved regions.

The geo-fence definition DB 220 illustrated in FIG. 6 stores the geo-fence definition information for each offering district and however, is not limited to this. The geo-fence definition DB 220 may store the geo-fence definition information for each application ID identifying the user application 110, or each application ID and offering district. Thereby, in the case where a plurality of types of user applications 110 are present, the geo-fence definition information corresponding to the related user application 110 may be offered for each user application 110 to the terminal device 10.

The service application DB 230 stores the service application. Here, the service application DB 230 is described with reference to FIG. 7. FIG. 7 is a view illustrating an example of the service application DB 230.

As illustrated in FIG. 7, the service application DB 230 stores the service application associated with the geo-fence ID for each geo-fence ID. For example, the geo-fence ID "a001" is associated with the service application having an application name "service application 1". Similarly, the geo-fence ID "a002" is associated with the service application having an application name "service application 2".

That means, if the user has entered the geo-fence defined by the geo-fence definition information identified by the geo-fence ID "a001", the service application having the application name "service application 1" is offered to the terminal device 10. Similarly, if the user has entered the geo-fence defined by the geo-fence definition information identified by the geo-fence ID "a002", the service application having the application name "service application 2" is offered to the terminal device 10.

Figure 8:
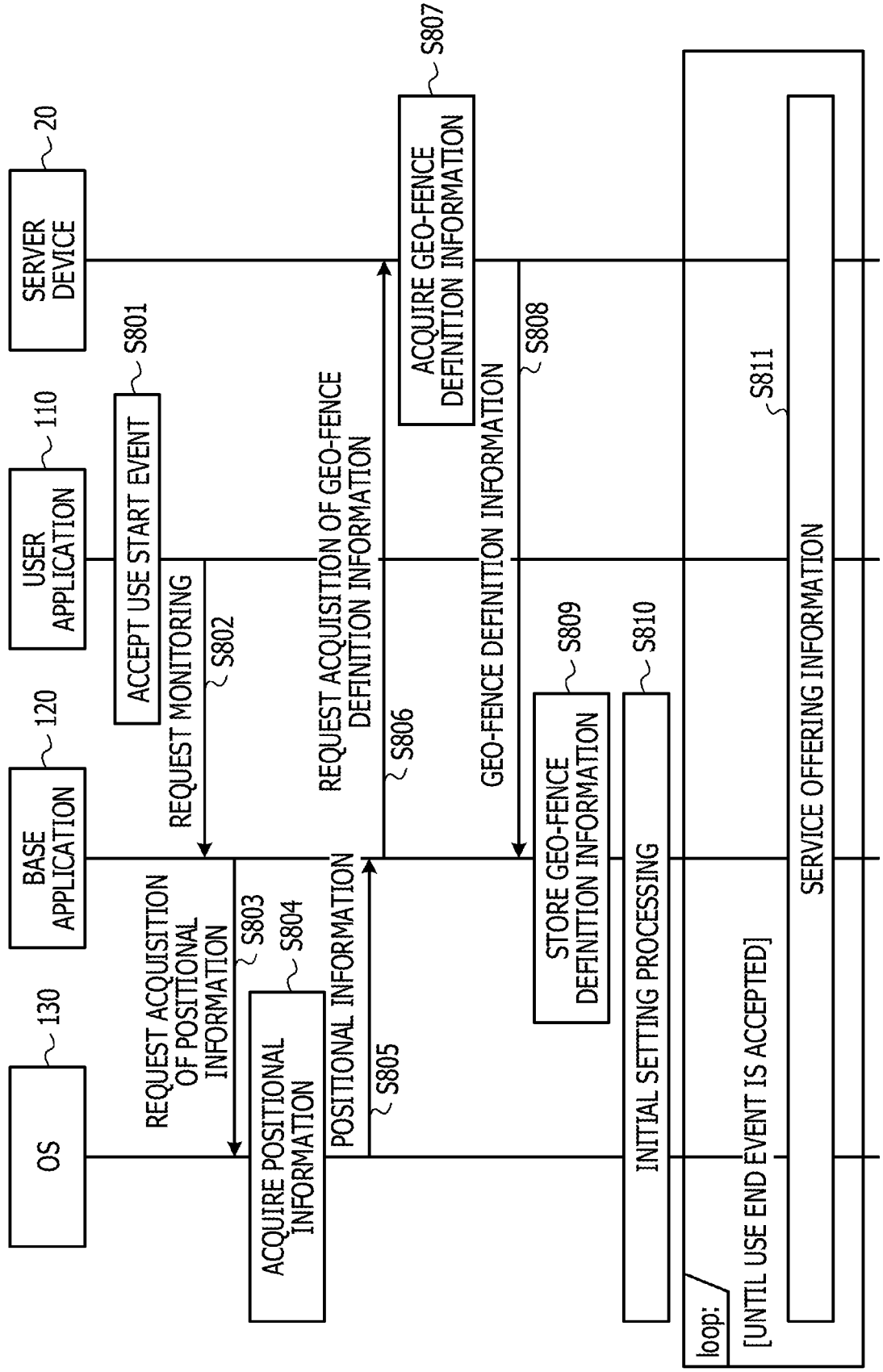
FIG. 8 is a view illustrating entire processing of service offering system according to the first embodiment.

Hereinafter, the entire processing of the service offering system 1 according to the present embodiment is described with reference to FIG. 8. FIG. 8 is a view illustrating an example of the entire processing of the service offering system 1 according to the first embodiment.

First, the use start unit 111 of the user application 110 accepts the use start event of the related user application 110 (S801).

Next, if the use start unit 111 accepts the use start event, the monitoring request unit 112 of the user application 110 requests the base application 120 to monitor the geo-fences (S802).

If the monitoring request unit 112 request monitoring of the geo-fences, the geo-fence acquisition unit 121 of the base application 120 requests the OS 130 to acquire positional information (S803).

If the geo-fence acquisition unit 121 request the OS 130 to acquire the positional information, the position acquisition unit 132 of the OS 130 acquires positional information indicating the position measured by the GPS receiver 19 (S804). Then, the position acquisition unit 132 returns the acquired positional information to the base application 120 (S805).

The current position of the terminal device 10 may not be necessarily measured by the GPS receiver 19. The current position of the terminal device 10 may be by Wi-Fi (registered trademark), or a beacon using Bluetooth (registered trademark) or the like.

If the OS 130 returns the positional information, the geo-fence acquisition unit 121 of the base application 120 transmits an acquisition request of the geo-fence to the server device 20 (S806). At this time, the acquisition request of the geo-fence includes the positional information (that is, positional information indicating the user's current position) returned from the OS 130.

As described above, the geo-fence acquisition unit 121 may include an application ID in the acquisition request of the geo-fence.

If the geo-fence offering unit 211 of the server device 20 receives an acquisition request of the geo-fence definition information, the geo-fence offering unit 211 acquires the geo-fence definition information corresponding to the acquisition request from the geo-fence definition DB 220 (S807). That is, the geo-fence offering unit 211 identifies the offering district including the position indicated by the positional information included in the acquisition request, and acquires the geo-fence definition information about the identified offering district from the geo-fence definition DB 220.

The geo-fence offering unit 211 returns the geo-fence definition information from the geo-fence definition DB 220 to the terminal device 10 (S808). At this time, the geo-fence offering unit 211 may return information about the identified offering district (for example, a district name representing the offering district, and a polygonal region defining the offering district) to the terminal device 10.

The geo-fence acquisition unit 121 of the base application 120 stores the geo-fence definition information returned from the server device 20 in the application-side geo-fence definition table 300 (S809).

Here, application-side geo-fence definition table 300 is described with reference to FIG. 9. FIG. 9 is a view illustrating an example of the application-side geo-fence definition table 300. As illustrated in FIG. 9, the application-side geo-fence definition table 300 stores the geo-fence definition information returned from the server device 20.

According to the present embodiment, the application-side geo-fence definition table 300 stores the geo-fence definition information returned from the server device 20 and however, the present disclosure is not limited to this. For example, the application-side geo-fence definition table 300 may store the geo-fence definition information in advance.

Returning to FIG. 8, following S809, the base application 120 and the OS 130 execute initial setting processing (S810). In the initial setting processing, the geo-fence definition information indicating the service geo-fences is selected, and the geo-fence definition information indicating the control geo-fence is generated, and the geo-fence definition information is set to the OS 130. Details of the initial setting processing will be described later.

Next, the terminal device 10 and the server device 20 executes service offering processing, for example, until the user application 110 accepts a use end event (S811). An example of the use end event of the user application 110 is a use end operation performed on a predetermined screen displayed by the user application 110. In the service offering processing, it is determined whether the user has entered the geo-fence or has left the geo-fence, and the geo-fences are reset or a service is offered according to a determination result. Details of the service offering processing will be described later.

Figure 10:
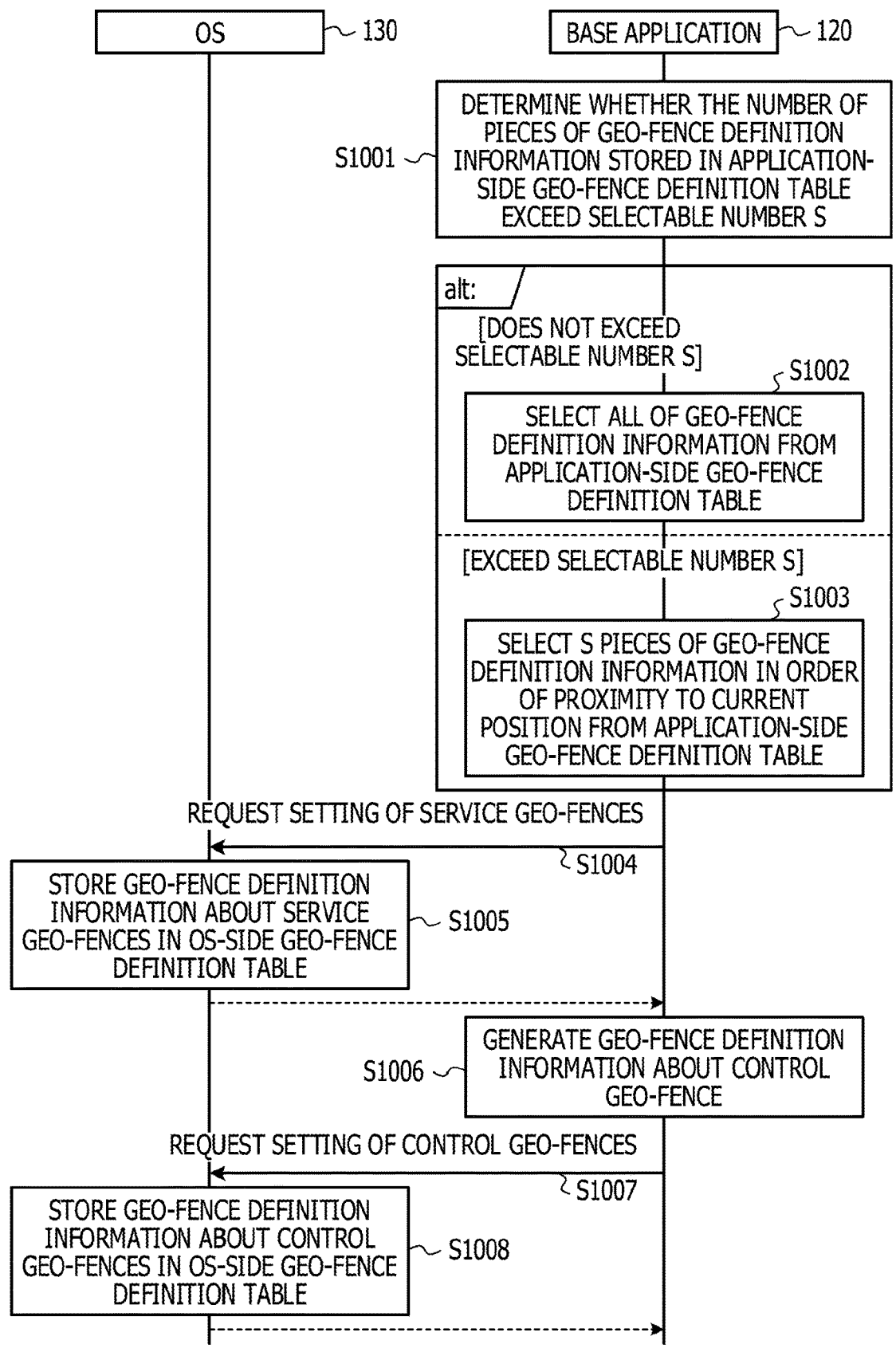
FIG. 10 is a sequence diagram illustrating an example of initial setting processing according to the first embodiment.

Hereinafter, details of the processing (initial setting processing) in S810 in FIG. 8 is described with reference to FIG. 10. FIG. 10 is a sequence diagram illustrating an example of the initial setting processing according to the first embodiment.

First, the selection unit 122 of the base application 120 determines whether or not the number of pieces of geo-fence definition information stored in the application-side geo-fence definition table 300 exceeds a selectable number S (S1001). The selectable number S is the number of service geo-fences that may be set to the OS 130. Using the maximum number M of the geo-fences that may be set to the OS 130 and the number of control geo-fence L (L=1 in the present embodiment), the selectable number S is expressed by the equation: $S = M - L$.

If it is determined that the number of pieces of geo-fence definition information stored in the application-side geo-fence definition table 300 does not exceed the selectable number S in S1001, the base application 120 executes processing in S1002. That is, in this case, the selection unit 122 of the base application 120 selects all of the geo-fence definition information stored in the application-side geo-fence definition table 300 (S1002). Thereby, S or less pieces of geo-fence definition information are selected.

On the contrary, if it is determined that the number of pieces of geo-fence definition information stored in the application-side geo-fence definition table 300 exceeds the selectable number S in S1001, the base application 120 executes processing in S1003. That is, in this case, the selection unit 122 of the base application 120 selects S pieces of geo-fence definition information at maximum in the order of proximity of the geo-fences defined by the definition information to the user's current position, from all of the geo-fence definition information stored in the application-side geo-fence definition table 300 (S1003).

The order of proximity to the user's current position may be the order of proximity of the geo-fences defined by the definition information to the latitude and longitude of the current position, or in the order of proximity of the boundary of the geo-fence to the latitude and longitude of the current position. The current position may be the position indicated by the positional information returned in S805 in FIG. 8, or new positional information may be acquired by the position acquisition unit 132.

The selection unit 122 may not necessarily select the geo-fence definition information in the order of proximity to the user's current position. For example, in the case where priority is assigned to the geo-fence definition information, the selection unit 122 may select S pieces of geo-fence definition information at maximum in the order of priority.

Following S1002 or S1003, the setting request unit 124 of the base application 120 requests the OS 130 to set the service geo-fences (S1004). The request includes the geo-fence definition information selected by the selection unit 122.

If the setting request unit 124 requests the OS 130 to set the service geo-fences, the setting unit 131 of the OS 130 stores the geo-fence definition information included in the request in the OS-side geo-fence definition table 400 (S1005). Thereby, the service geo-fences are set to the OS 130.

Next, the generation unit 123 of the base application 120 generates the geo-fence definition information about the control geo-fence (S1006). For example, the generation unit 123 generates the geo-fence definition information about the control geo-fence representing a circular area having a predetermined radius (for example, a few hundreds of meters) about the user's current position.

However, the geo-fence definition information about the control geo-fence generated by the generation unit 123 is not limited to this. The generation unit 123 may generate the geo-fence definition information about the control geo-fence representing a region other than the circular region including the user's current position. Examples of the region other than the circular region includes an elliptical region, a polygonal region, and regions defined various curved lines.

Next, the setting request unit 124 of the base application 120 requests the OS 130 to set the control geo-fence (S1007). The request includes the geo-fence definition information generated by the generation unit 123.

If the setting request unit 124 requests the OS 130 to set the control geo-fence, the setting unit 131 of the OS 130 stores the geo-fence definition information included in the request in the OS-side geo-fence definition table 400 (S1008). Thereby, the control geo-fence is set to the OS 130.

Here, as an example, the OS-side geo-fence definition table 400 in the case where the maximum number M of geo fences that may be set to the OS 130 is "20" is described with reference to FIG. 11. FIG. 11 is a view illustrating an example of the OS-side geo-fence definition table 400.

As illustrated in FIG. 11, the OS-side geo-fence definition table 400 stores the geo-fence definition information about 19 service geo-fences having geo-fence IDs "a001" to "a019". The OS-side geo-fence definition table 400 stores the geo-fence definition information about one control geo-fence having the geo-fence ID of "c000".

As described above, the OS-side geo-fence definition table 400 stores S=M−L or less pieces of geo-fence definition information about the service geo-fences and L (L=1 in the present embodiment) piece of geo-fence definition information about the control geo-fence. As described above, the geo-fences defined by the geo-fence definition information stored in the OS-side geo-fence definition table 400 are geo-fences to be monitored.

In FIG. 10, the service geo-fences are selected and set (S1001 to S1005) and then, the control geo-fence is generated and set (S1006 to S1008) and however, the order of processing may be inverted. That is, the control geo-fence may be generated and set (S1006 to S1008) and then, the service geo-fences may be selected and set (S1001 to S1005). Further, the generated control geo-fence and the selected service geo-fences may be simultaneously set as the monitoring targets on the side of the OS 130.

Figure 12:
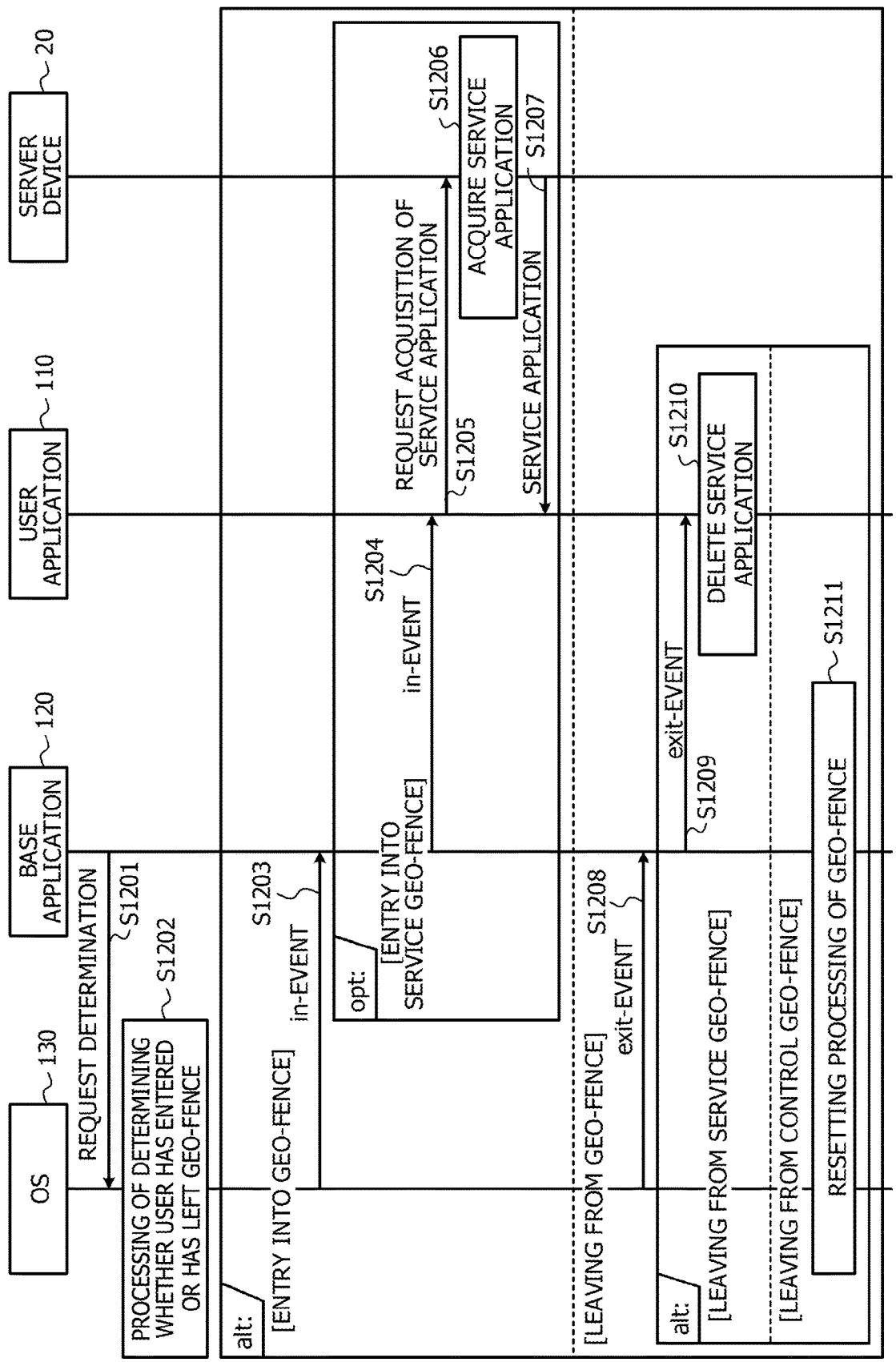
FIG. 12 is a sequence diagram illustrating an example of service offering system according to the first embodiment.

Hereinafter, details of the processing (the service offering processing) in S811 in FIG. 8 is described with reference to FIG. 12. FIG. 12 is a sequence diagram illustrating an example of the service offering processing according to the present embodiment.

First, the determination request unit 125 of the base application 120 requests the OS 130 to determine whether the user has entered the geo-fence or has left the geo-fence (S1201).

Figure 13:
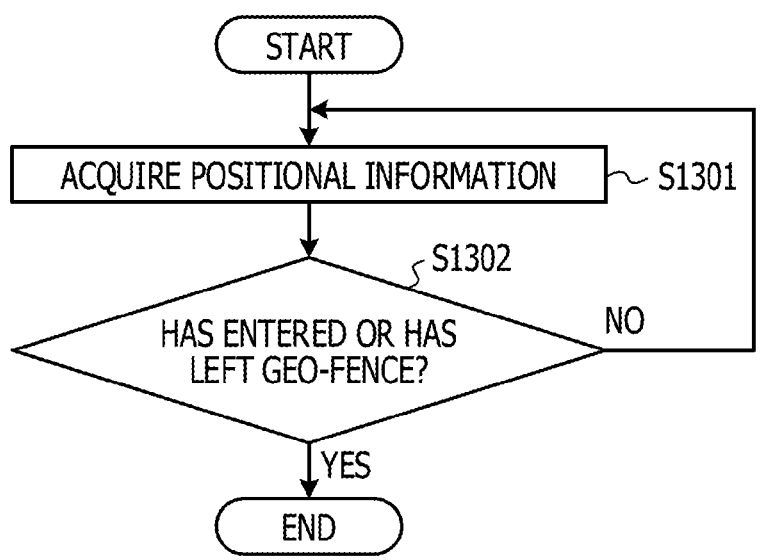
FIG. 13 is a flow chart illustrating an example of processing of determining whether the user has entered the geo-fence or the left the geo-fence according to the first embodiment.

If the determination request unit 125 requests the OS 130 to determine whether the user has entered the geo-fence or has left the geo-fence, the OS 130 starts processing of determining whether the user has entered the geo-fence or the user has left the geo-fence (S1202). Here, the processing of determining whether the user has entered the geo-fence or has left the geo-fence is described with reference to FIG. 13. FIG. 13 is a flow chart illustrating an example of the processing of determining whether the user has entered the geo-fence or has left the geo-fence according to the first embodiment.

The position acquisition unit 132 of the OS 130 acquires positional information indicating the position measured by the GPS receiver 19 (that is, the current position of the user using the terminal device 10) (S1301).

Next, referring to the OS-side geo-fence definition table 400, the position determination unit 133 determines whether the user has entered the geo-fence or has left the geo-fence (S1302). For example, for each of the pieces of geo-fence definition information stored in the OS-side geo-fence definition table 400, the position determination unit 133 determines whether or not the geo-fence defined by the geo-fence definition information concerned includes the user's current position. Then, if it is determined that the geo-fence defined by the geo-fence definition information concerned includes the user's current position, the position determination unit 133 determines that the user has entered the geo-fence. On the contrary, if it is determined that the geo-fence defined by the geo-fence definition information concerned does not include the user's current position, the position determination unit 133 determines that the user has left the geo-fence.

If it is not determined that the user has entered the geo-fence and also the user has left the geo-fence in S1302, the OS 130 returns to S1301. Therefore, in this case, the processing in S1301 and S1302 is repeated at regular intervals. In the case where a position-measurement interval of the GPS receiver 19 is ΔT, the processing in S1301 and S1302 is repeated at the interval of ΔT.

Thereby, the geo-fences (the service geo-fences and the control geo-fence) set as the monitoring targets to the OS 130 are monitored.

On the contrary, if it is determined that the user has entered the geo-fence or it is determined that the user has left the geo-fence in S1302, the OS 130 finishes the processing of determining whether the user has entered the geo-fence or has left the geo-fence.

Returning to FIG. 12, if it is determined that the user has entered the geo-fence in S1202, below-mentioned processing in S1203 to S1207 is executed. On the contrary, if it is determined that the user has left the geo-fence in S1202, below-mentioned processing in S1208 to S1211 is executed.

If it is determined that the user has entered the geo-fence in S1202, the event notification unit 134 notifies the in-event indicating that the user has entered geo-fence to the base application 120 (S1203). The in-event includes the geo-fence ID identifying the geo-fence that the user has entered. The in-event may include the positional information acquired in S1301 in FIG. 8 (the positional information indicating the user's current position).

If the in-event notified from the OS 130 is the in-event indicating the entry into the service geo-fence, the event relay unit 126 of the base application 120 notifies the in-event to the user application 110 (S1204). On the contrary, if the in-event notified from the OS 130 is the entry into the control geo-fence, the event relay unit 126 of the base application 120 abandons the in-event. If the geo-fence ID included in the in-event is not included in the application-side geo-fence definition table 300, the event relay unit 126 may determine the geo-fence identified by the geo-fence ID as the control geo-fence. On the contrary, if the geo-fence ID included in the in-event is included in the application-side geo-fence definition table 300, the event relay unit 126 may determine the geo-fence identified by the geo-fence ID as the service geo-fence.

If the in-event is notified from the base application 120, the service processing unit 113 of the user application 110 transmits the acquisition request of the service application to the server device 20 (S1205). The acquisition request of the service application includes the geo-fence ID included in the in-event.

If the application offering unit 212 of the server device 20 receives the acquisition request of the service application, the application offering unit 212 acquires the service application corresponding to the related acquisition request from the service application DB 230 (S1206). That is, the application offering unit 212 acquires the service application corresponding to the geo-fence ID included in the related acquisition request from the service application DB 230.

Then, the application offering unit 212 returns the service application acquired from the service application DB 230 to the terminal device 10 (S1207).

Figure 14:
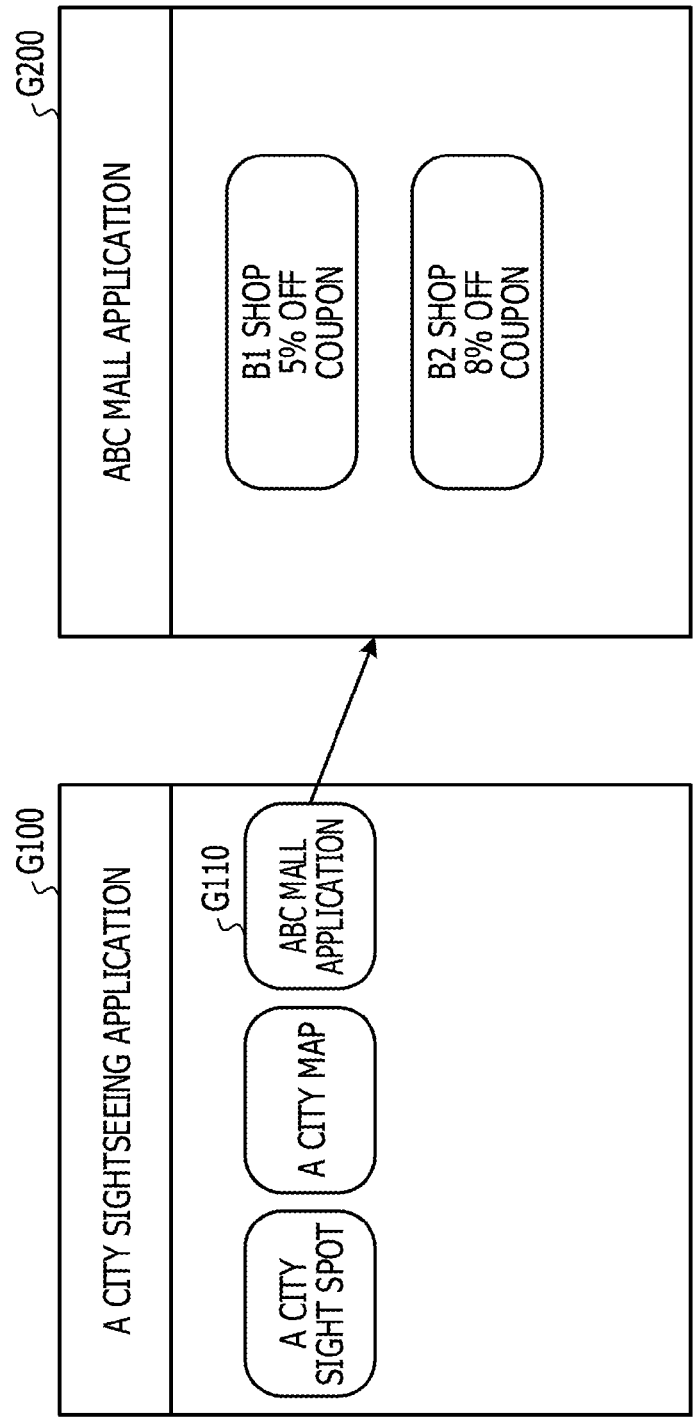
FIG. 14 is a view illustrating an example of a service use screen.

Thereby, the service implemented by the service application is offered to the user using the terminal device 10. Here, as an example, a use screen of the service offered in the case where the user application 110 is "A city sightseeing application" and the user has entered the service geo-fence defined in the geographical range representing "ABC mall" in an A city is described with reference to FIG. 14. FIG. 14 is a view illustrating an example of the service use screen.

The service use screen G100 illustrated in FIG. 14 is displayed by the user application 110. If an "ABC mall application" that is an example of the service application is returned from the server device 20, the user application 110 displays an icon G110 on the service use screen G100.

The icon G110 is a display element for using the service offered by the "ABC mall application". If the user selects the icon G110, the "ABC mall application" displays the service use screen G200. Thereby, the user may use the service offered by the "ABC mall application" (for example, coupon information available in shops in the "ABC mall").

According to the present embodiment, if the user has entered the service geo-fence, the user application 110 acquires the service application corresponding to the related service geo-fence from the server device 20 and however, the present disclosure is not limited to this. If the user has entered the service geo-fence, the user application 110 may output information corresponding to the related service geo-fence (for example, displaying of image or text information, reproduction of animation or music, and sending of a mail).

Returning to FIG. 12, if it is determined that the user has left the geo-fence in S1202, the event notification unit 134 notifies the exit-event indicating that the user has left the geo-fence to the base application 120 (S1208). The exit-event includes the geo-fence ID identifying the geo-fence that the user has left. The exit-event may include the positional information acquired in S1301 in FIG. 8 (positional information indicting the user's current position).

If the exit-event notified from the OS 130 is the exit-event indicating that the user has left the service geo-fence, the event relay unit 126 of the base application 120 notifies the exit-event concerned to the user application 110 (S1209).

If the exit-event is notified from the base application 120, the service processing unit 113 of the user application 110 deletes the service application corresponding to the geo-fence ID included in the related exit-event (S1210). Thereby, the service application finishes offering of its service.

Figure 15:
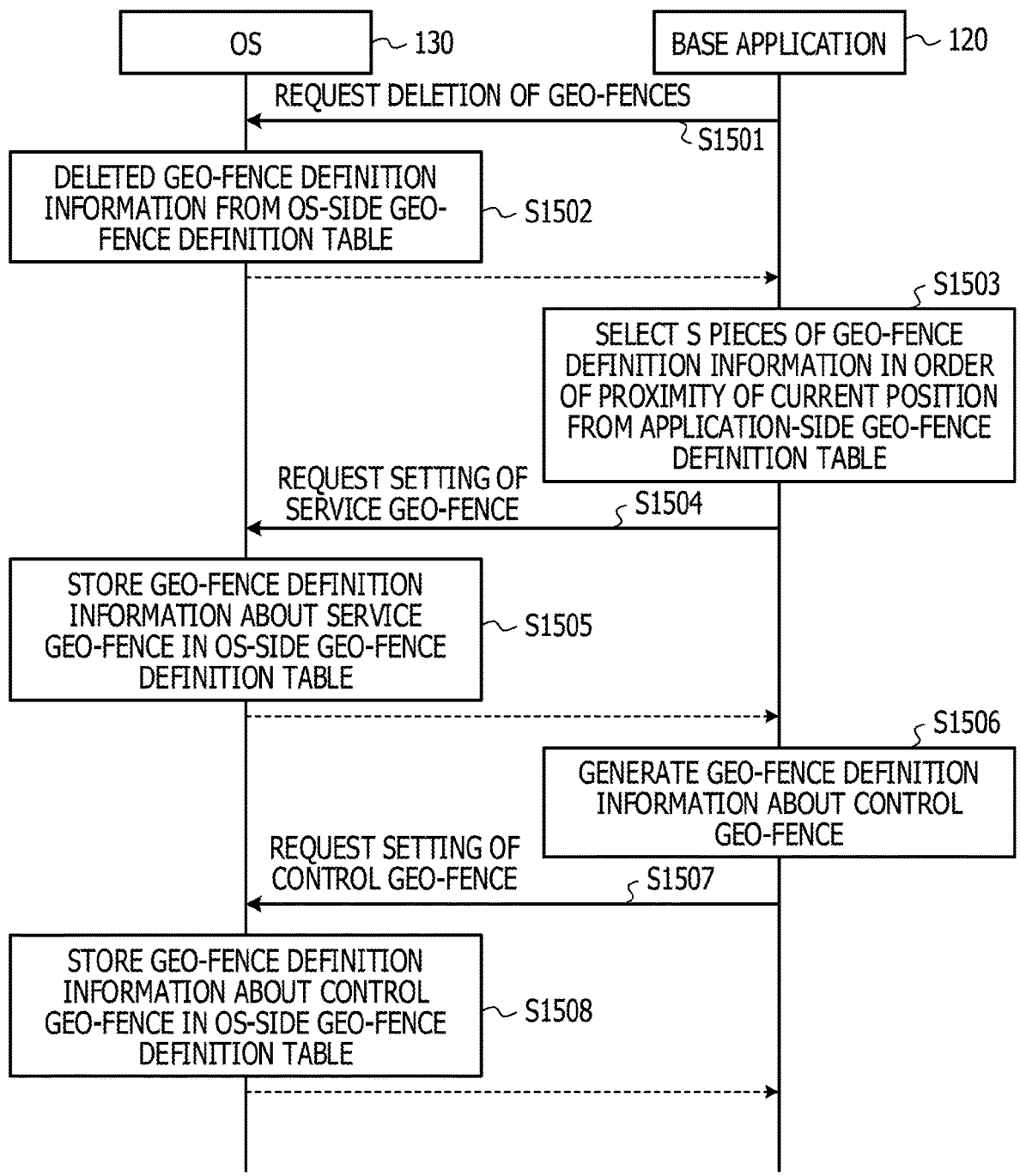
FIG. 15 is a sequence diagram illustrating an example of resetting processing of geo-fences according to the first embodiment.

On the contrary, if the exit-event notified from the OS 130 is the exit-event indicating that the user has left the control geo-fence, the base application 120 executes resetting processing of the geo-fences (S1211). That is, the base application 120 reselects the service geo-fences and resets the service geo-fences to the OS 130, and regenerates the control geo-fence and resets the control geo-fence to the OS 130. Here, the resetting processing of the geo-fences is described with reference to FIG. 15. FIG. 15 is a sequence diagram illustrating an example of resetting processing of the geo-fences according to the first embodiment.

First, the setting request unit 124 of the base application 120 requests the OS 130 to delete the geo-fences (S1501).

If the setting request unit 124 requests the OS 130 to delete the geo-fences, the setting unit 131 of the OS 130 deletes all of the geo-fence definition information stored in the OS-side geo-fence definition table 400 (S1502). Thereby, the geo-fences set as the monitoring targets to the OS 130 are deleted.

Next, the selection unit 122 of the base application 120 selects S pieces of geo-fence definition information at maximum in the order of proximity of the geo-fences defined by the geo-fence definition information to the user's current position, from among the geo-fence definition information stored in the application-side geo-fence definition table 300 (S1503).

For example, it may be determined whether or not the district (the offering district) to which the user's current position belongs has changed, based on the positional information included in the exit-event notified from the OS 130. Such determination may be made in the terminal device 10, based on the related positional information and information about the offering district returned from the server device 20 in S808 in FIG. 8, or may be made in the server device 20 by transmitting an inquiry including the related positional information from the terminal device 10 to the server device 20. Then, if it is determined that the district to which the user's current position belongs has changed, prior to the processing in S1503, the geo-fence acquisition unit 121 of the terminal device 10 may acquire geo-fence definition information corresponding to the changed district (offering district) from the server device 20 to update the application-side geo-fence definition table 300.

Next, the setting request unit 124 of the base application 120 requests the OS 130 to set the service geo-fences (S1504). The request includes the geo-fence definition information selected by the selection unit 122.

If the setting request unit 124 requests the OS 130 to set the service geo-fences, the setting unit 131 of the OS 130 stores the geo-fence definition information included in the request in the OS-side geo-fence definition table 400 (S1505). Thereby, the service geo-fences are reset to the OS 130.

The above-mentioned processing in S1502 is not necessarily executed. That is, the OS 130 does not delete the geo-fence definition information from the OS-side geo-fence definition table 400, and in place of this, for example, the selection unit 122 stores service geo-fences previously set as monitoring targets to the OS 130. Then, the selection unit 122 identifies a difference between the stored service geo-fences and the service geo-fence selected this time in S1503. Then, the selection unit 122 may request the OS 130 to delete the geo-fence definition information about the service geo-fence that is not selected this time, from the geo-fence definition information stored in the OS-side geo-fence definition table 400, and add geo-fence definition information about the new service geo-fence selected this time. Thereby, the requests to the OS 130 about monitoring, setting, and deleting may be made more efficient.

Next, the generation unit 123 of the base application 120 generates the geo-fence definition information about the control geo-fence (S1506). For example, the generation unit 123 generates the geo-fence definition information about the control geo-fence representing a circular area having a predetermined radius about the user's current position. At this time, the generation unit 123 may use the position indicated by the positional information included in the exit-event notified from the OS 130 as the user's current position. The generation unit 123 may reacquire the positional information indicating the user's current position from the position acquisition unit 132.

Next, the setting request unit 124 of the base application 120 requests the OS 130 to set the control geo-fence (S1507). The request includes the geo-fence definition information generated by the generation unit 123.

If the setting request unit 124 requests the OS 130 to set the control geo-fence, the setting unit 131 of the OS 130 stores the geo-fence definition information included in the request in the OS-side geo-fence definition table 400 (S1508). Thereby, the control geo-fence is reset to the OS 130.

In FIG. 15, the geo-fence definition information is deleted from the OS-side geo-fence definition table 400 (S1501 to S1502) and then, the service geo-fences are selected and set, and the control geo-fence is generated and set and however, the present disclosure is not limited to this. For example, the geo-fence definition information about the service geo-fences may be deleted from the geo-fence definition information stored in the OS-side geo-fence definition table 400 and then, the service geo-fences may be selected and set. Similarly, the geo-fence definition information about the control geo-fence may be deleted from the geo-fence definition information stored in the OS-side geo-fence definition table 400 and then, the control geo-fence may be generated and set.

The order of the processing of selecting and setting the service geo-fences (S1503 to S1505) and the processing of generating and setting the control geo-fence (S1506 to S1508) may be inverted.

As described above, the terminal device 10 according to the present embodiment sets the service geo-fences selected from the service geo-fences predefined on the map, and the control geo-fence including the user's current position, as the monitoring targets to the OS 130. Then, if the user has left the control geo-fence, the terminal device 10 according to the present embodiment reselects and resets the service geo-fences, and generates and resets the control geo-fence. Thereby, according to the movement of the user, the terminal device 10 according to the present embodiment may properly change areas to be monitored (service geo-fences).

Since the OS 130 in the terminal device 10 according to the present embodiment makes determination, even if the base application 120 operates in the background, the OS 130 may determine whether the user has entered the geo-fence or the user has left the geo-fence. Similarly, even if the base application 120 is not activated, the terminal device 10 according to the present embodiment may determine whether the user has entered the geo-fence or the user has left the geo-fence.

Figure 16:
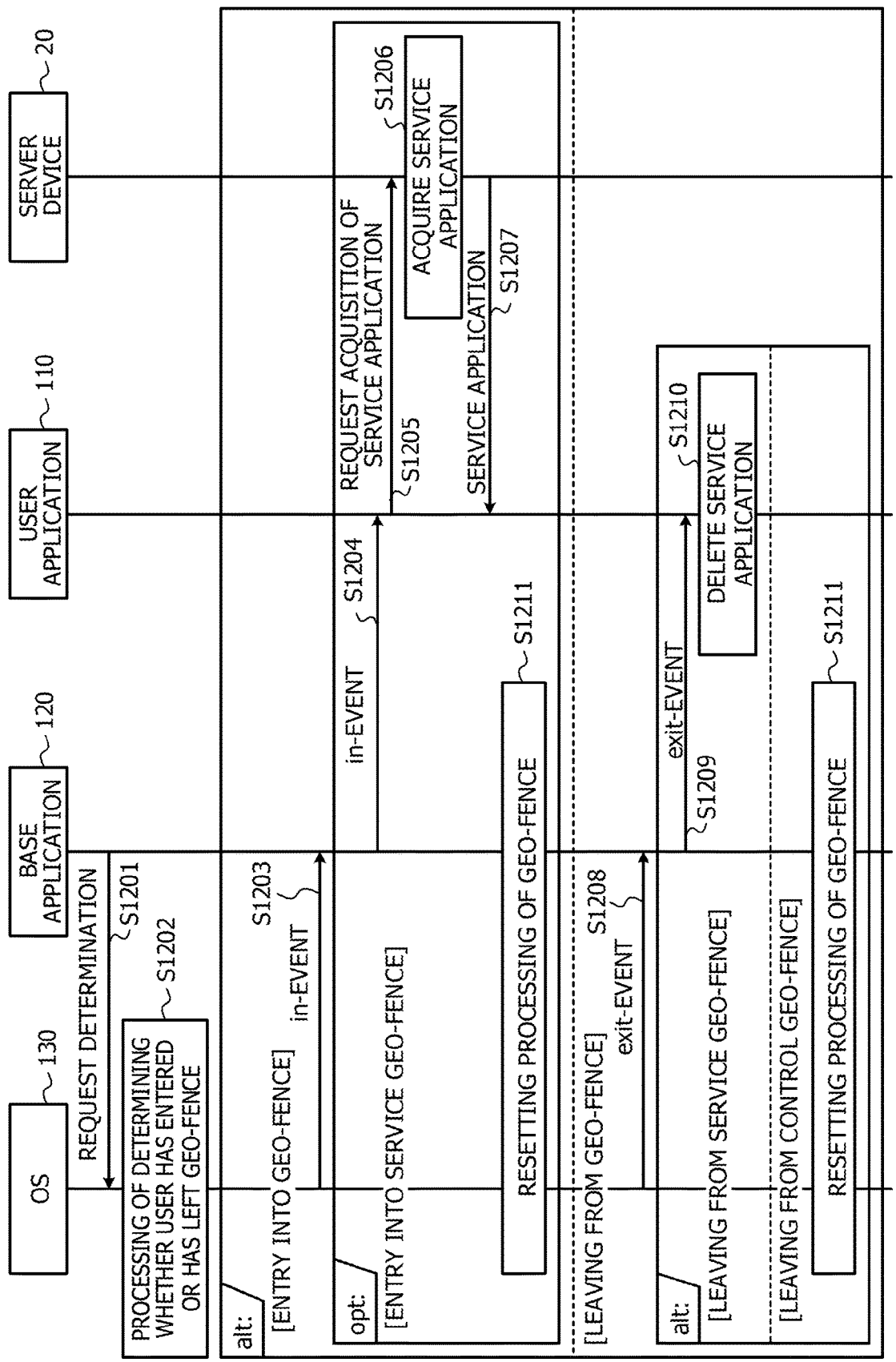
FIG. 16 is a sequence diagram illustrating another example of the service offering processing according to the first embodiment.

Further, if the user has entered the service geo-fence, the terminal device 10 according to the present embodiment may reselect and reset the service geo-fences, and generate and reset the control geo-fence. The case where, if the user has entered the service geo-fence, the service geo-fences are reselected and reset, and the control geo-fence is generated and reset is described with reference to FIG. 16. FIG. 16 is a sequence diagram illustrating another example of the service offering processing according to the first embodiment. S1201 to S1211 in FIG. 16 are the same as those in FIG. 12 and thus, description thereof is omitted.

The base application 120 notifies the in-event to the user application 110 (S1204) and then, executes S1211. Thereby, the base application 120 executes the resetting processing of the geo-fences (processing in S1211 in FIG. 12).

As described above, the terminal device 10 according to the present embodiment may offer the service by the related application, and execute the resetting processing of the geo-fences (the processing in S1211 in FIG. 12).

Similarly, if the user has left the service geo-fence, the terminal device 10 according to the present embodiment may reselect and reset the service geo-fences, and generate and reset the control geo-fence. In this case, the base application 120 may notify the exit-event to the user application 110 (S1209 in FIG. 12) and then, reset the geo-fences.

(Second Embodiment)

Next, a second embodiment is described. According to the second embodiment, it is assumed that the control geo-fence is a circular area, and a radius $r_0$ of the control geo-fence is dynamically calculated.

Differences between the second embodiment and the first embodiment are mainly described, and the same constituents in the second embodiment as those first embodiment are given the same reference numerals as those in the first embodiment, and description thereof is omitted.

Figure 17:
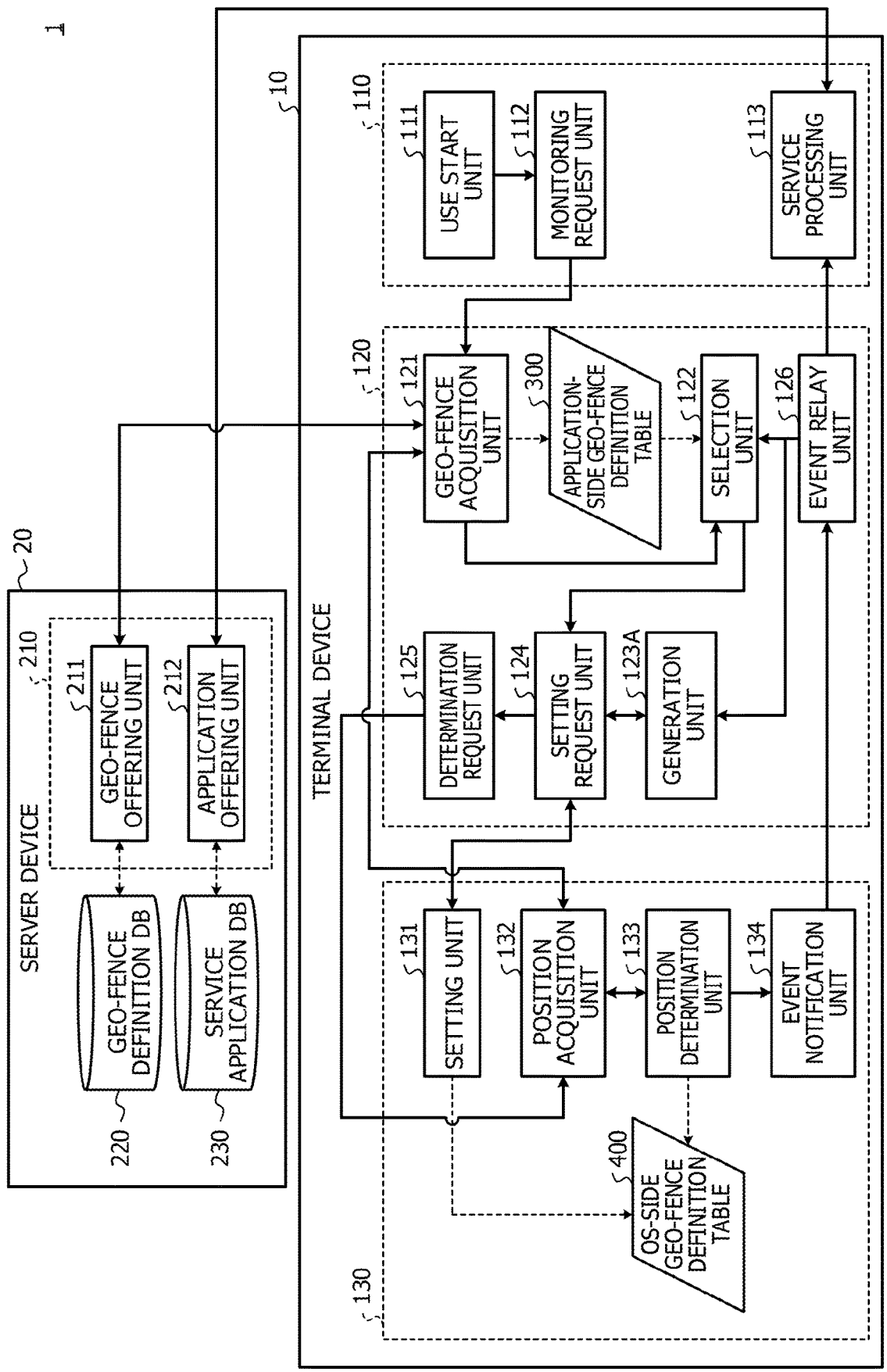
FIG. 17 is a view illustrating an example of a functional configuration of a service offering system according to a second embodiment.

First, a functional configuration of the service offering system 1 according to the present embodiment is described with reference to FIG. 17. FIG. 17 is a view illustrating an example of the functional configuration of the service offering system 1 according to the second embodiment.

As illustrated in FIG. 17, a terminal device 10 according to the present embodiment has a generation unit 123A. The generation unit 123A generates geo-fence definition information about the control geo-fence representing a circular area having radius $r_0$. At this time, for example, the generation unit 123A calculates the radius $r_0$ based on a distance to the service geo-fence defined by the geo-fence definition information that is not selected by the selection unit 122 among the geo-fence definition information stored in the application-side geo-fence definition table 300.

Figure 18:
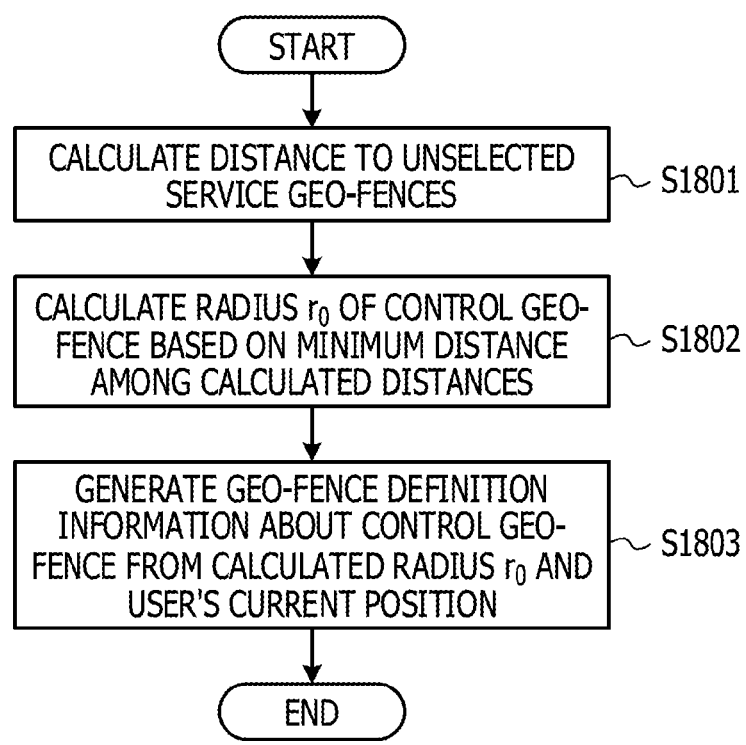
FIG. 18 is a flow chart illustrating an example of processing of generating geo-fence definition information about a control geo-fence according to the second embodiment.

Hereinafter, the processing of generating the geo-fence definition information about the control geo-fence (the processing in S1006 in FIGS. 10 and S1506 in FIG. 15) according to the present embodiment is described with reference to FIG. 18. FIG. 18 is a flow chart illustrating an example of the processing of generating the geo-fence definition information about the control geo-fence according to the second embodiment.

First, the generation unit 123A identifies the geo-fence definition information that is not selected by the selection unit 122 among the geo-fence definition information stored in the application-side geo-fence definition table 300. In other words, the generation unit 123A identifies the geo-fence definition information about the service geo-fences that are not set to the OS 130 among the geo-fence definition information stored in the application-side geo-fence definition table 300.

Then, the generation unit 123A calculates the distance between the user's current position and each of the service geo-fences defined by the identified geo-fence definition information (S1801).

Figure 19:
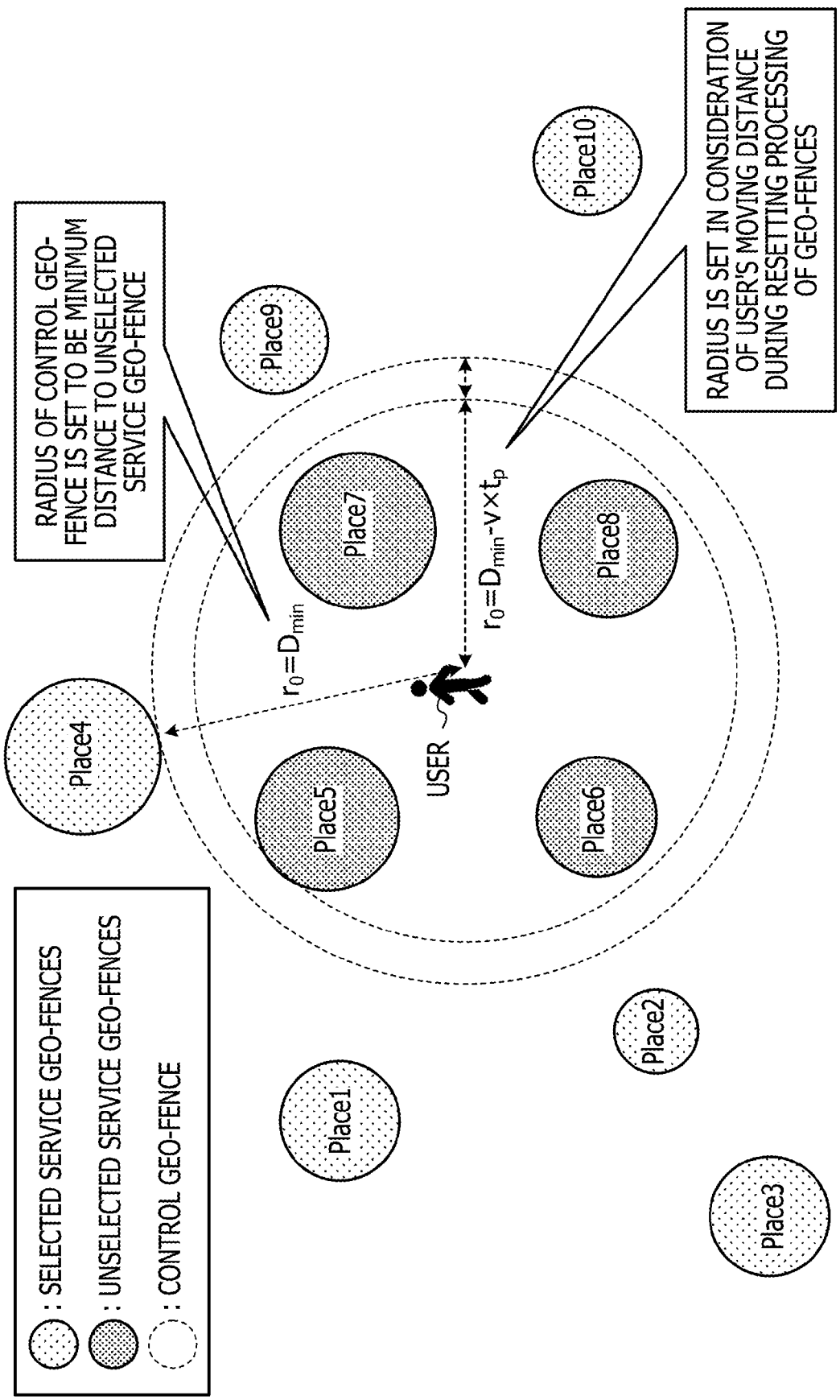
FIG. 19 is a view for describing an example of the case of calculating a radius of the control geo-fence.

For example, as illustrated in FIG. 19, it is assumed that "place 1" to "place 4" and "place 9" to "place 10" among service geo-fences "place 1" to "place 10" are service geo-fences that are not selected by the selection unit 122. In this case, the generation unit 123A calculates the distance between the user's current position and each of the service geo-fences "place 1" to "place 4" and "place 9" to "place 10". The distance between the user's current position and the service geo-fence may be the minimum distance between the user's current position and the boundary of the service geo-fence.

If the selection unit 122 selects the service geo-fences after the generation unit 123A generated the control geo-fence, the generation unit 123A may identify the geo-fence definition information that is not selected by the selection unit 122.

Next, the generation unit 123A calculates the radius $r_0$ of the control geo-fence based on a minimum distance $D_{min}$ among the distances calculated in S1801 (S1802). For example, the generation unit 123A may calculate the radius $r_0$ by a following mode (1) or (2).

(1) As illustrated in FIG. 19, the generation unit 123A sets the minimum distance $D_{min}$ (that is, the distance to the service geo-fence "place 4") among the distances calculated in S1801 as the radius $r_0$ of the control geo-fence. This is due to that no unselected service geo-fence (that is, the service geo-fence that is not to set to the OS 130) is present in the circular area having the radius $r_0=D_{min}$ about the user's current position.

(2) As illustrated in FIG. 19, the generation unit 123 calculates the radius $r_0$ of the control geo-fence in consideration of a moving distance of the user in the resetting processing of the geo-fences in FIG. 15. In this case, given that a moving speed of the user is v and a time of the processing of reselecting the geo-fences is $t_p$, $r_0$ may be set to $D_{min}-v \times t_p$. Thereby, even if the moving speed v of the user is large, it is possible to suppress the situation that the user enters the service geo-fence that is not set to the OS 130 before completion of the processing of reselecting the geo-fences.

In the above-mentioned mode (1) or (2), a predetermined margin M may be considered. For example, in the above-mentioned mode (1), $r_0$ may be set to $D_{min}-M$. Similarly, for example, in the above-mentioned mode (2), $r_0$ may be set to $D_{min}-v \times t_p-M$.

Next, the generation unit 123A generates the geo-fence definition information about the control geo-fence from the radius $r_0$ calculated in S1802 and the user's current position (S1803). That is, the generation unit 123A generates the geo-fence definition information about the control geo-fence representing a circular area having the radius $r_0$ calculated in S1802 about the user's current position.

In this manner, according to the movement of the user, the terminal device 10 according to the present embodiment may dynamically calculate the radius of the control geo-fence. At this time, the terminal device 10 according to the present embodiment calculates the radius of the control geo-fence based on the distance to the service geo-fences that are not set to the OS 130. This may suppress the situation that the user enters the service geo-fences that are not set to the OS 130, and reduce the frequency of the processing of reselecting the geo-fences.

Therefore, it is possible to suppress the situation that the processing of reselecting the geo-fences is frequently executed since the radius $r_0$ of the control geo-fence is small, increasing processing loads or power consumption of the CPU 17 of the terminal device 10.

Figure 20:
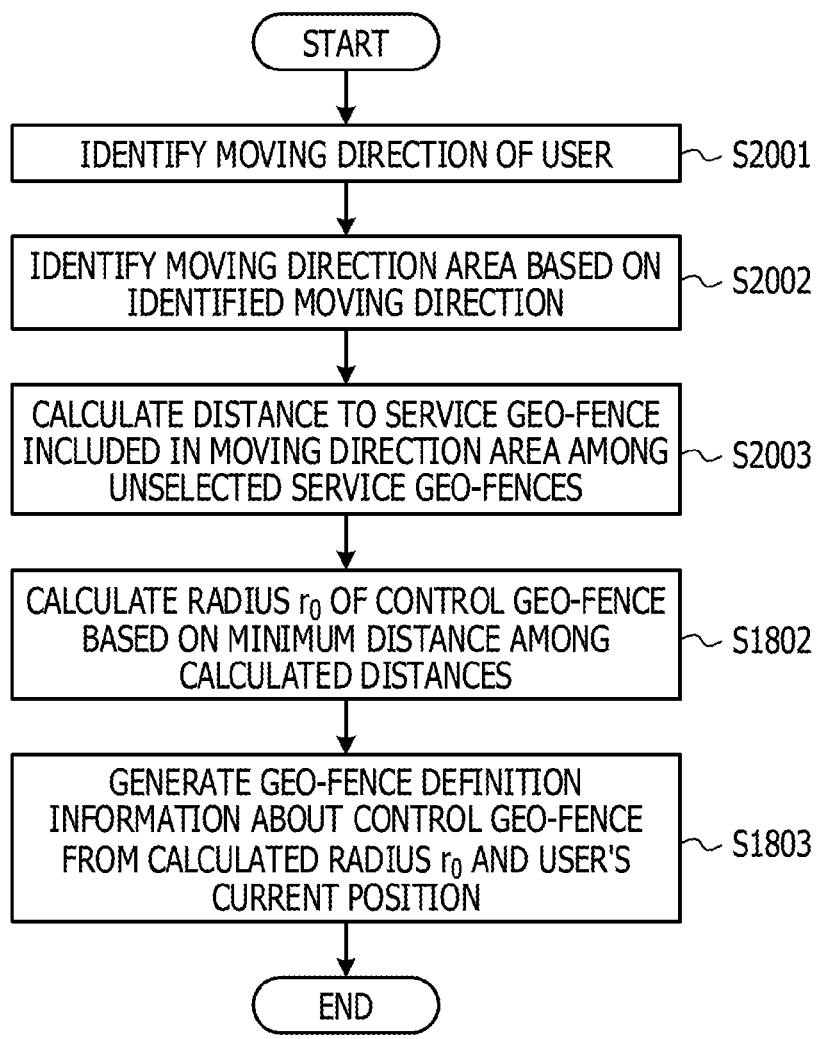
FIG. 20 is a flow chart illustrating an example of processing of generating geo-fence definition information about the control geo-fence according to the second embodiment.

Here, another example of the processing of generating the geo-fence definition information about the control geo-fence according to the present embodiment is described with reference to FIG. 20. FIG. 20 is a flow chart illustrating another example of the processing of generating the geo-fence definition information about the control geo-fence according to the second embodiment.

First, the generation unit 123A identifies the moving direction of the user (S2001). A method of identifying the moving direction of the user is not specifically limited. The generation unit 123A may identify the moving direction by a following mode (1) or (2).

(1) In the case where the terminal device 10 includes an acceleration sensor or an electronic compass, the moving direction of the user is identified using the acceleration sensor or the electronic compass.

(2) The moving direction of the user is identified based on records of service geo-fences that the user has previously entered (check-in). It is assumed that the service geo-fences that the user has previously checked in are "place A", "place B", "place C", and "place D". A direction from the center of "place A" toward the center of "place B" (for example, when the north is 0 degree, a clockwise direction is a positive direction) is defined as $\theta_1$. Similarly, a direction from the center of "place B" toward the center of "place C" is defined as $\theta_2$, and a direction from the center of "place C" toward the center of "place D" is defined as $\theta_3$.

At this time, compass errors $d_1=\theta_2-\theta_1$ and $d_2=\theta_3-\theta_2$ are calculated, and if $d_2-d_1$ is equal to or smaller than a predetermined value d, the generation unit 123A may define the moving direction of the user as $\theta_3$.

Next, the generation unit 123A identifies the moving direction area U based on the moving direction identified in S2001 (S2002). For example, as illustrated in FIG. 21, the generation unit 123A identifies an area that is located within a predetermined area on a map, and on the side of the moving direction with respect to a straight line, which is orthogonal to the moving direction and passes the user's current position, as the moving direction area U.

Next, the generation unit 123A identifies the geo-fence definition information that is included in the moving direction area U and is not selected by the selection unit 122, among the geo-fence definition information stored in the application-side geo-fence definition table 300. In other words, the generation unit 123A identifies the geo-fence definition information about the service geo-fences that are not set to the OS 130 and are included in the moving direction area U, among the geo-fence definition information stored in the application-side geo-fence definition table 300.

Then, the generation unit 123A calculates the distance between the user's current position and each of the service geo-fences defined by the identified geo-fence definition information (S2003).

Figure 21:
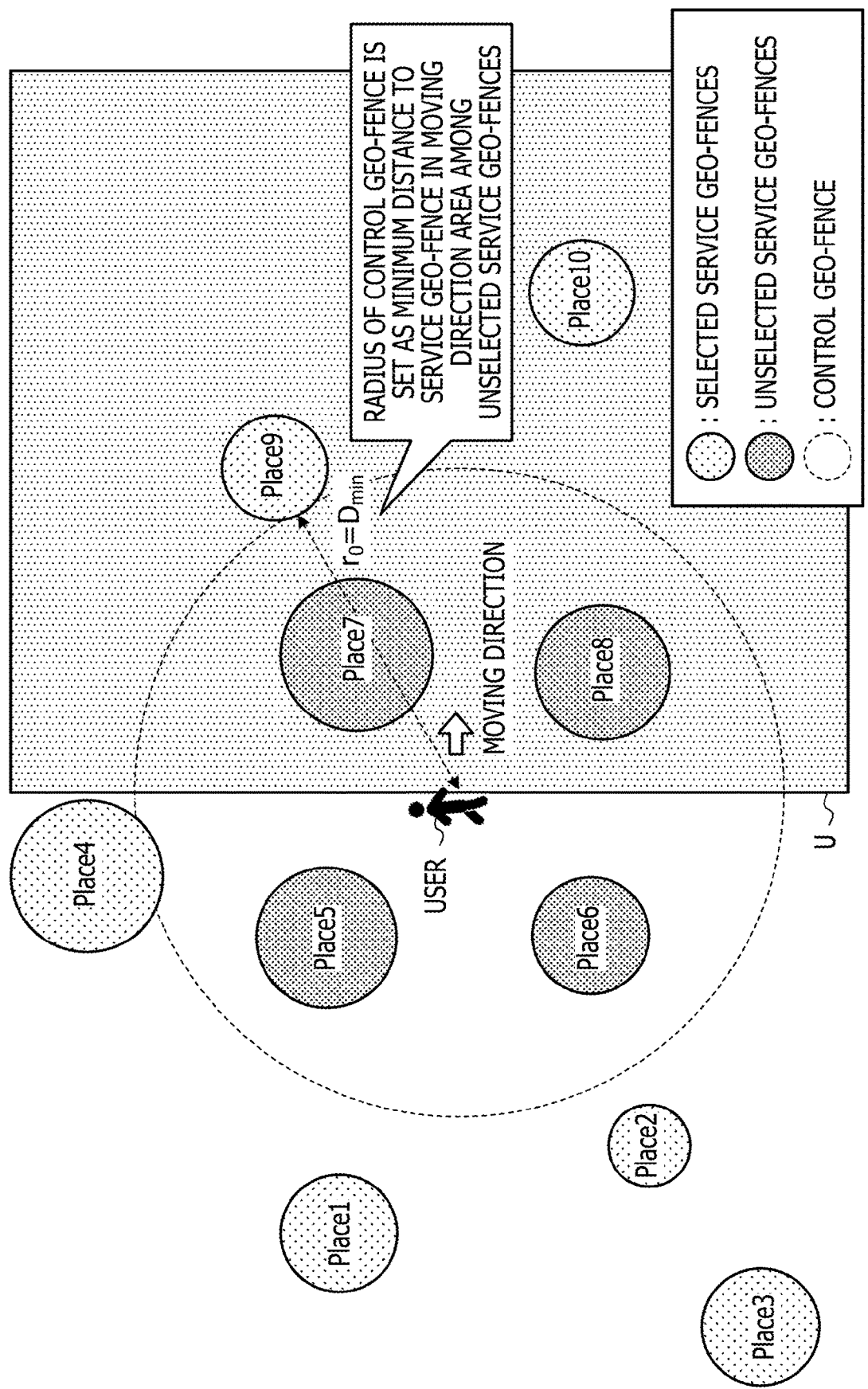
FIG. 21 is a view for describing another example of the case of calculating the radius of the control geo-fence.

As illustrated in FIG. 21, it is assumed that "place 1" to "place 4", and "place 9" to "place 10" among the service geo-fences "place 1" to "place 10" are the service geo-fences that are not selected by the selection unit 122. In this case, the service geo-fences that are not set to the OS 130 and are included in the moving direction area U are "place 9" and "place 10". Accordingly, the generation unit 123A calculates the distances between the user's current position and each of the service geo-fences "place 9" and "place 10". This is due to that the user is unlikely to enter the service geo-fences that are not included in the moving direction area U. Thereby, it is possible to suppress the situation that the radius $r_0$ of the control geo-fence becomes unnecessarily small due to the effect of the service geo-fences that are not included in the moving direction area U. S1802 and S1803 are the same as those in FIG. 18.

In this manner, the terminal device 10 according to the present embodiment may dynamically calculate the radius of the control geo-fence in consideration of the moving direction of the user. At this time, the terminal device 10 according to the present embodiment may exclude the service geo-fences into which the user is unlikely to enter in consideration of the moving direction of the user, and calculate the radius of the control geo-fence. Thereby, the frequency of the processing of reselecting the geo-fences may be further suppressed.

If no geo-fence definition information that is not selected by the selection unit 122 is present in S1801 in FIG. 18 (that is, the number of pieces of the geo-fence definition information stored in the application-side geo-fence definition table 300 is equal to or smaller than S), the radius of the control geo-fence may be a predetermined value.

(Third Embodiment)

Next, a third embodiment is described. According to the first embodiment and the second embodiment, if the user has left the control geo-fence, the service geo-fences and the control geo-fence are reset.

Depending on the OS 130, a few minutes may be taken from the determination that the user has left the control geo-fence to the notification of the exit-event to the base application 120. For this reason, for example, when the user in a car is moving at high speed, the user may enter the service geo-fence that is not set to the OS 130 before completion of the resetting processing of the geo-fences.

Meanwhile, for the in-event, a few seconds is taken from the determination that the user has entered the geo-fence to the notification to the base application 120. Thus, according to the third embodiment, if the user has entered the control geo-fence, the service geo-fences and the control geo-fence are reset.

Differences between the third embodiment and the first embodiment are mainly described, and the same constituents in the third embodiment as those first embodiment are given the same reference numerals as those in the first embodiment, and description thereof is omitted.

Figure 22:
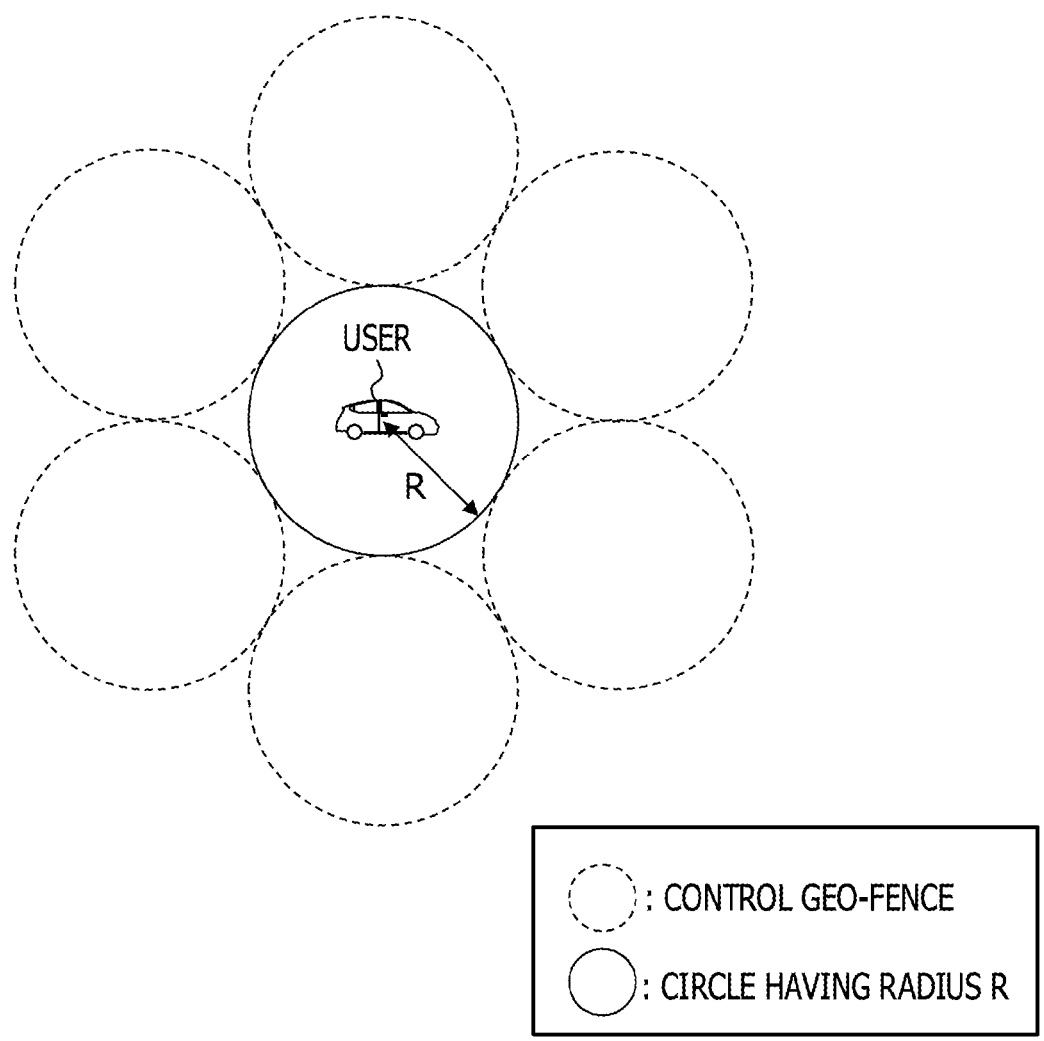
FIG. 22 is a view for describing an example of a control geo-fence according to a third embodiment.

An example of control geo-fence according to the third embodiment is described with reference to FIG. 22. FIG. 22 is a view illustrating an example of the control geo-fence according to the third embodiment.

As illustrated in FIG. 22, according to the present embodiment, L (L=6 in the example illustrated in FIG. 22) control geo-fences are set to the OS 130 such that the control geo-fences circumscribe the circle having the radius R about the user's current position and the adjacent control geo-fences circumscribe each other. L is previously set to an integer of 3 or more.

According to the present embodiment, the control geo-fence generated based on the current position of the terminal device 10 (the computer) is an area generated around the current position of the terminal device 10. For example, a circular area that circumscribes the circle having a predetermined radius about the current position of the terminal device 10 is set as the control geo-fence.

By setting the control geo-fence as illustrated in FIG. 22 to the OS 130, even if the user moves in any direction, the user will enter the control geo-fence.

Figure 23:
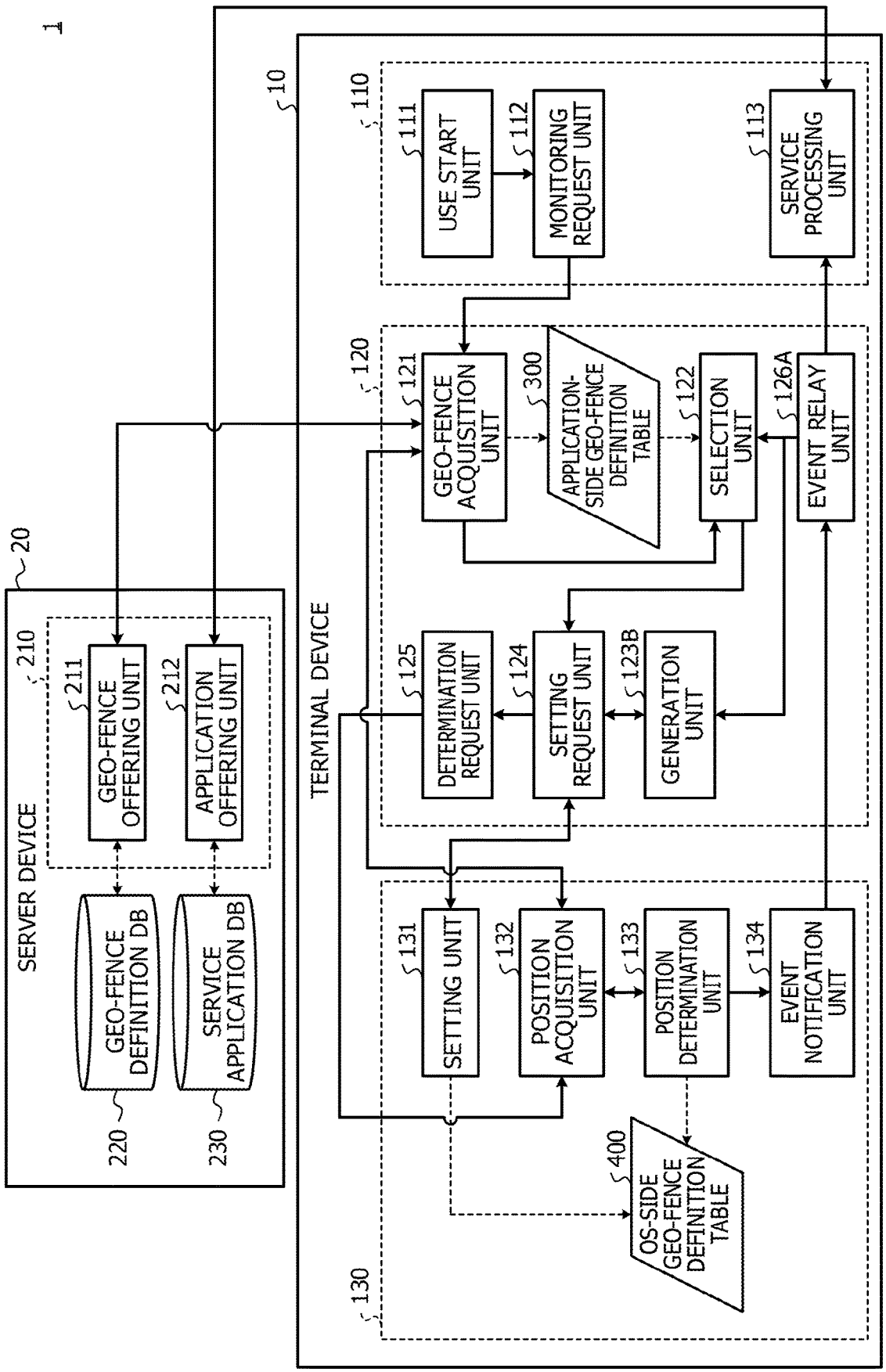
FIG. 23 is a view illustrating an example of a functional configuration of a service offering system according to the third embodiment.

Next, a functional configuration of the service offering system 1 according to the present embodiment is described with reference to FIG. 23. FIG. 23 is a view illustrating an example of the functional configuration of the service offering system 1 according to the third embodiment.

As illustrated in FIG. 23, the terminal device 10 according to the present embodiment includes a generation unit 123B and an event relay unit 126A.

The generation unit 123B generates geo-fence definition information about each of L control geo-fences such that the control geo-fences circumscribe the circle having the radius R and the adjacent control geo-fences circumscribe each other.

The event relay unit 126A relays the event (the in-event or the exit-event) notified from the OS 130. At this time, if the in-event into the service geo-fence or the exit-event from the service geo-fence is notified, the event relay unit 126A notifies the in-event or the exit-event to the user application 110.

If the in-event into the control geo-fence is notified, the event relay unit 126A notifies the in-event to the selection unit 122. The in-event into the control geo-fence is notified to the selection unit 122, such that the selection unit 122 selects new service geo-fences. Similarly, the in-event into the control geo-fence is notified to the generation unit 123B, such that the generation unit 123B generates the new control geo-fence. On the contrary, if the exit-event from the control geo-fence is notified, the event relay unit 126A abandons the related exit-event.

Figure 24:
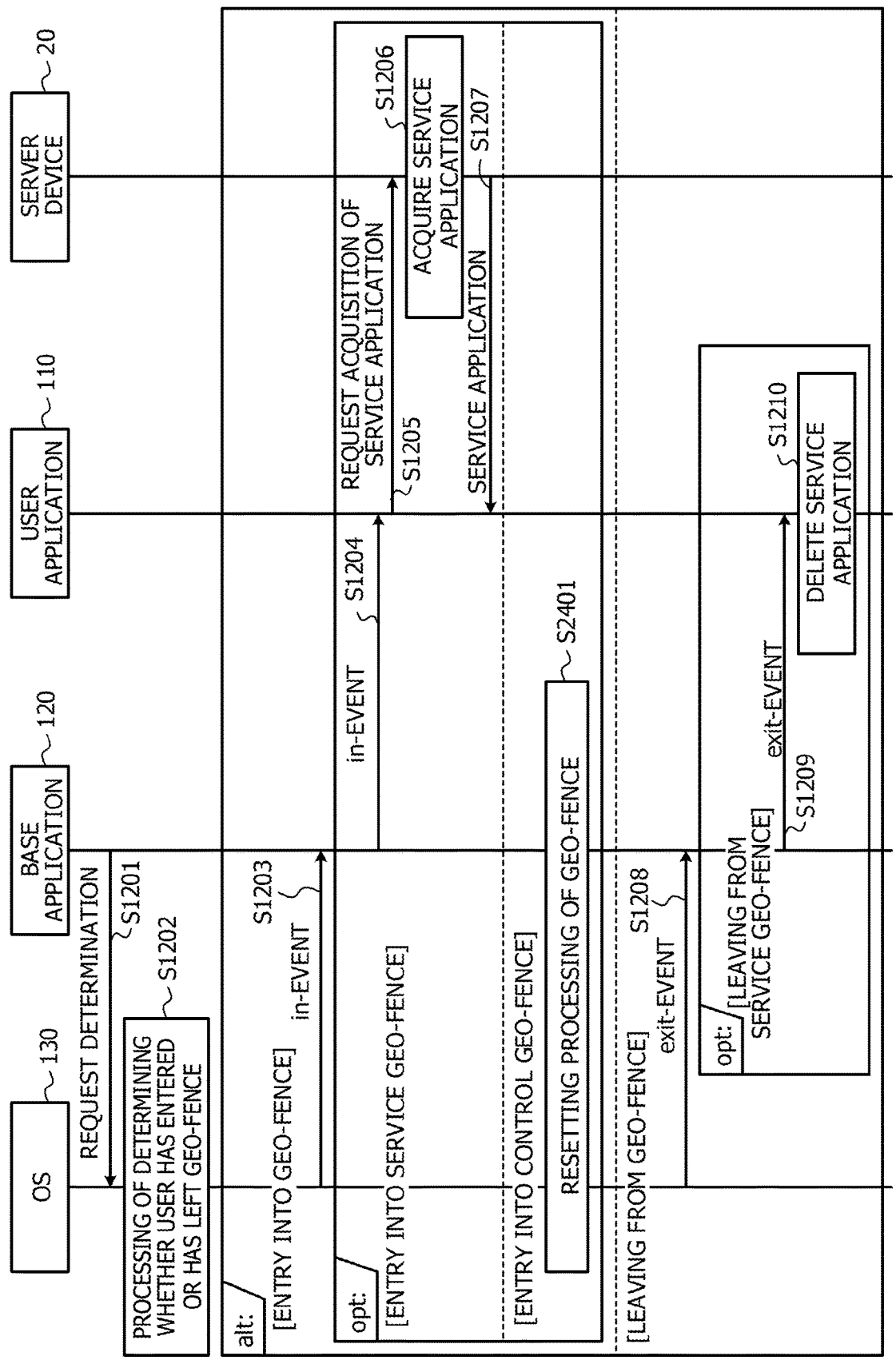
FIG. 24 is a sequence diagram illustrating an example of service offering processing according to the third embodiment.

Hereinafter, the entire processing of the service offering system 1 according to the present embodiment is described with reference to FIG. 24. FIG. 24 is a view illustrating an example of the entire processing of the service offering system 1 according to the third embodiment.

If the in-event notified from the OS 130 is the in-event indicating the entry into the control geo-fence, the event relay unit 126A of the base application 120 executes the resetting processing of the geo-fences in FIG. 15 (S2401).

In this manner, if the user has entered the control geo-fence, the terminal device 10 according to the present embodiment executes the resetting processing of the geo-fences. As described above, for the in-event, about a few seconds is taken from the determination that the user has entered the geo-fence to the notification to the base application 120. Therefore, for example, even if the user in a car is moving at high speed, the situation that the user enters the service geo-fence that is not set to the OS 130 may be suppressed.

Figure 25:
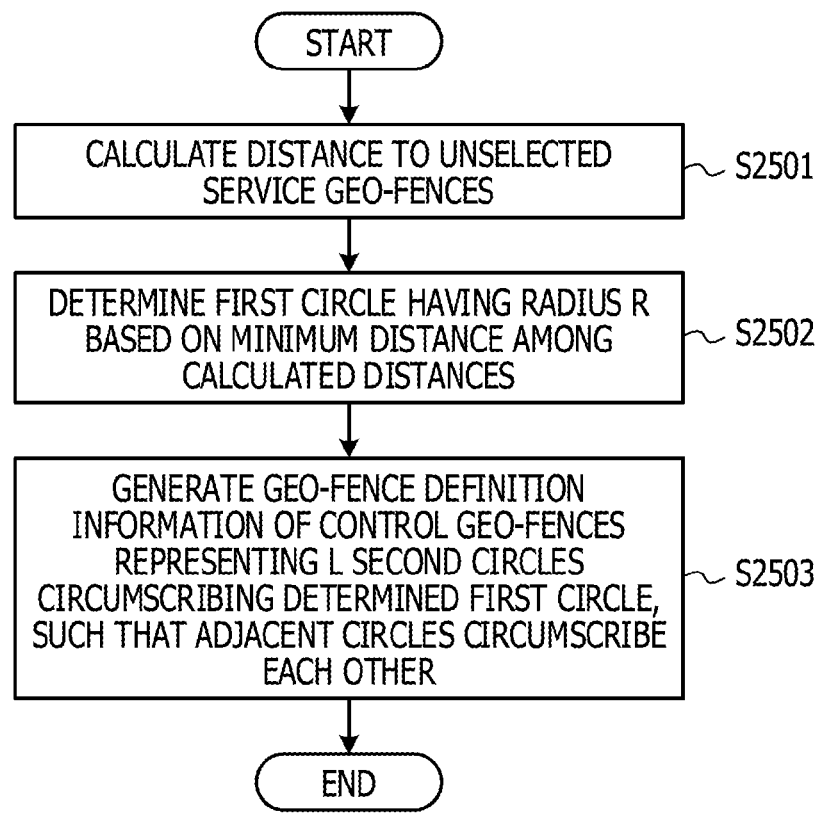
FIG. 25 is a flow chart illustrating an example of generating geo-fence definition information about the control geo-fence according to the third embodiment.

Hereinafter, the processing of generating the geo-fence definition information about the control geo-fence (the processing in S1006 in FIGS. 10 and S1506 in FIG. 15) according to the present embodiment is described with reference to FIG. 25. FIG. 25 is a flow chart illustrating an example of the processing of generating the geo-fence definition information about the control geo-fences according to the third embodiment.

First, the generation unit 123B identifies the geo-fence definition information that is not selected by the selection unit 122 among the geo-fence definition information stored in the application-side geo-fence definition table 300. In other words, the generation unit 123B identifies the geo-fence definition information about the service geo-fences that are not set to the OS 130 among the geo-fence definition information stored in the application-side geo-fence definition table 300.

Then, the generation unit 123A calculates the distance between the user's current position and each of the service geo-fences defined by the identified geo-fence definition information (S2501).

Next, the generation unit 123B determines a radius R based on a minimum distance $D_{min}$ among the distances calculated in S2501. Then, the generation unit 123B determines a first circle having the determined radius R about the user's current position (S2502). The generation unit 123B may set, as the radius R, radius $R=D_{min}$, or may set $R=D_{min}+M$ in consideration of a predetermined margin M.

Next, the generation unit 123B identifies L second circles that circumscribe the first circle determined in S2502 such that the adjacent circles circumscribe each other. Then, the generation unit 123B generates the geo-fence definition information about the control geo-fences each representing the circular area using the identified second circles as boundaries (S2503).

In this manner, the terminal device 10 according to the present embodiment may set the L control geo-fences circumscribing the circle having the radius R about the user's current position such that the adjacent control geo-fence circumscribe each other, to the OS 130. In other words, the terminal device 10 according to the present embodiment may define the L control geo-fences that do not include the user's current position so as to surround the user, and set the L control geo-fences to the OS 130.

Thereby, if the user has moved and entered the control geo-fence, the terminal device 10 according to the present embodiment may reset the service geo-fences and the control geo-fences.

According to the present embodiment, since the control geo-fences are the geo-fences around the user's current position at a certain time (for example, circular areas that circumscribe the circle having a predetermined radius about the current position), when the user moves from the position, the event of the entry into the geo-fence naturally occurs. Thereby, the application 140 (the base application 120) may receive the notification from the OS 130, and reselect and reset the service geo-fences. That is, by introducing the control geo-fences that forcibly cause an entry into the geo-fence, when the user has entered the control geo-fence, the application 140 (base application 120) necessarily reselect the service geo-fences. This may suppress a following situation: the service geo-fences are not reselected and reset since no event is notified from the OS 130 and therefore, the monitoring targets of the OS 130 are not changed.

If no geo-fence definition information that is not selected by the selection unit 122 is present in S2501 in FIG. 25 (that is, the number of pieces of geo-fence definition information stored in the application-side geo-fence definition table 300 is equal to or smaller than S), the radius of the first circle may be a predetermined value.

Figure 26:
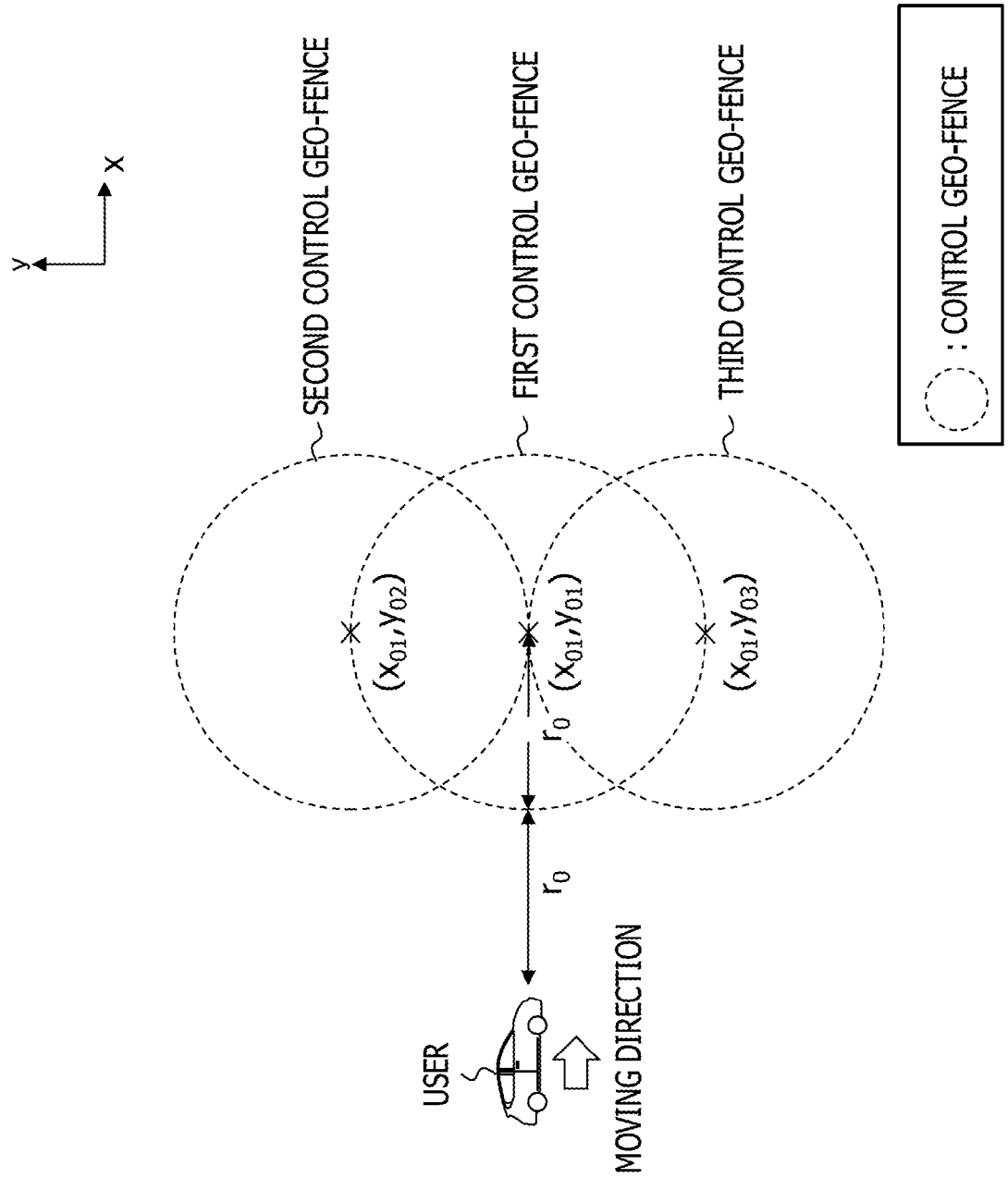
FIG. 26 is a view for describing another example of the control geo-fence according to the third embodiment.

In FIG. 25, the geo-fence definition information about the L control geo-fences defined so as to surround the user is generated. However, if the moving direction of the user is identified, the L control geo-fences are not necessarily defined so as to surround the user. If the moving direction of the user is identified as illustrated in FIG. 26, L (L=3 in the example illustrated in FIG. 26) control geo-fences in front of the moving direction may be set to the OS 130. In the example illustrated in FIG. 26, given that an x axis is defined as a direction parallel to the moving direction of the user, and a y axis is defined as a direction orthogonal to the moving direction, a first control geo-fence representing the circular area having the radius $r_0$ about a position $(x_{01}, y_{01})$ is set away from the user's current position by $2r_0$ in the positive direction of the x axis. The second control geo-fence representing the circular area having the radius $r_0$ about a position $(x_{01}, y_{02})$ is set away from the first control geo-fence by $r_0$ in the positive direction of the y axis. Similarly, the third control geo-fence representing a circular area having a radius $r_0$ about a position $(x_{01}, y_{03})$ is set away from the first control geo-fence by $r_0$ in the negative direction of the y axis.

Figure 27:
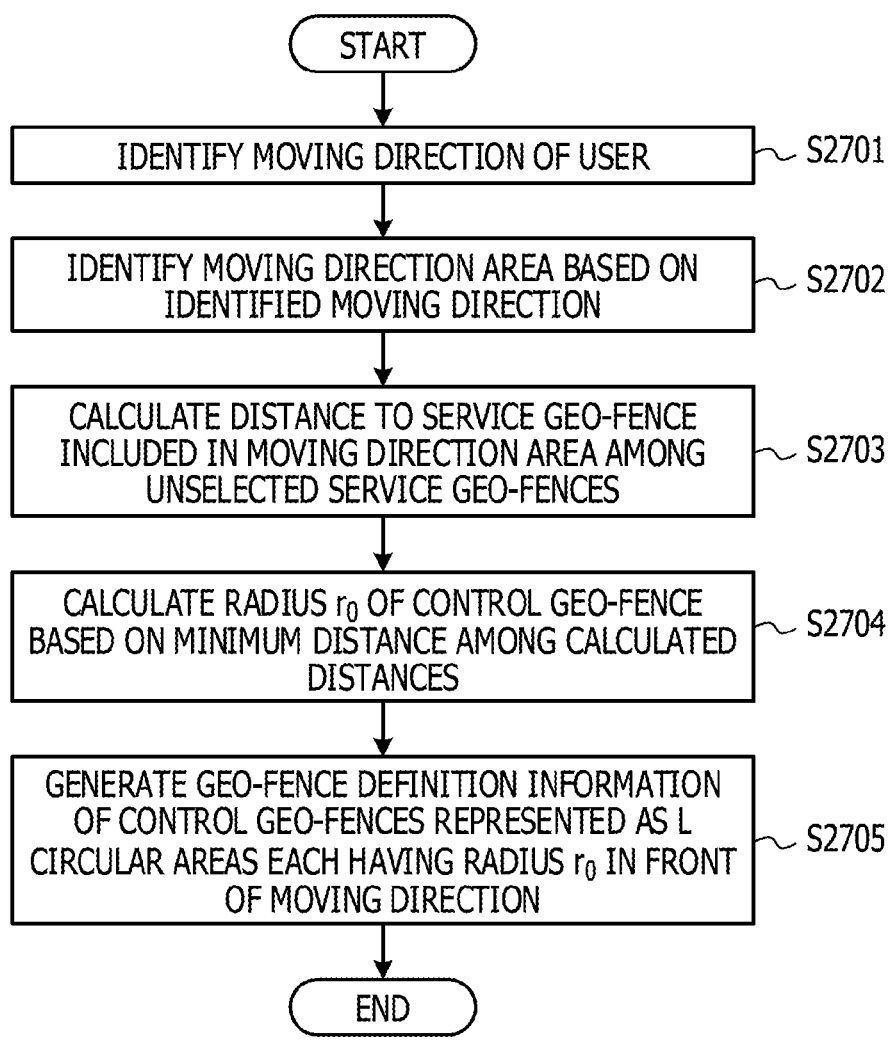
FIG. 27 is a flow chart illustrating another example of generating geo-fence definition information about the control geo-fence according to the third embodiment.

Thus, the processing of generating the geo-fence definition information about the control geo-fences in the case where the moving direction of the user is identifiable is described below with reference to FIG. 27. FIG. 27 is a flow chart illustrating another example of the processing of generating the geo-fence definition information about the control geo-fences according to the third embodiment.

First, the generation unit 123B identifies the moving direction of the user (S2701). The moving direction of the user may be identified by the same method as S2001 in FIG. 20.

Next, the generation unit 123B identifies a moving direction area U based on the moving direction identified in S2701 (S2702).

Next, the generation unit 123B identifies the geo-fence definition information that is included in the moving direction area U and is not selected by the selection unit 122, among the geo-fence definition information stored in the application-side geo-fence definition table 300.

Then, the generation unit 1238 calculates the distance between the user's current position and each of the service geo-fences defined by the identified geo-fence definition information (S2703).

Next, the generation unit 1238 calculates the radius $r_0$ of the control geo-fence based on a minimum distance $D_{min}$ among the distances calculated in S2703 (S2704). The generation unit 1238 may set $r_0=D_{min}$, or may set $r_0=D_{min}-M$ in consideration of a predetermined margin M.

Next, the generation unit 1238 generates the geo-fence definition information about the control geo-fences represented as L circular areas having the radius $r_0$ in front of the moving direction identified in S2701 (S2705). Given that L is 3, the generation unit 1238 generates the geo-fence definition information about the first control geo-fence represented as the circular area having the radius $r_0$ about the position of away from the user's current position by $2r_0$ in the positive direction of an x axis. The generation unit 1238 generates the geo-fence definition information about the second control geo-fence represented as the circular area having the radius $r_0$ about the position away from the first control geo-fence by $r_0$ in the positive direction of a y axis. Further, the generation unit 1238 generates the geo-fence definition information about the third control geo-fence represented as the circular area having the radius $r_0$ about the position away from the first control geo-fence by $r_0$ in the negative direction of a y axis.

In this manner, the terminal device 10 according to the present embodiment may set the L control geo-fences to the OS 130 in front of the moving direction of the user in consideration of the moving direction of the user. In FIG. 27, the geo-fence definition information about the control geo-fences represented as the L circular areas in front of the moving direction of the user is generated, and however, the present disclosure is not limited to this. For example, in the case where the geo-fence may be defined as a rectangular area, the generation unit 123A may generate the geo-fence definition information about the control geo-fence represented as one rectangular area in front of the moving direction of the user.

The generation unit 123 is an example of a first generation unit and a second generation unit in the claims. The selection unit 122 is an example of a first selection unit and a second selection unit in the claims. The setting unit 131 is an example of a setting unit and a resetting unit in the claims. The position determination unit 133 is an example of a determination unit in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer having an operating system (OS) for monitoring entry into or leaving from a monitoring target area to execute a process, the process comprising:
   generating first area information according to a position of the computer at a first time;
   selecting second area information from among a plurality of predefined candidate area information based on the position of the computer at the first time, the second area information being less than a maximum number of the monitoring target areas set to the OS by the number of the first area information or more;
   setting the first area information and the second area information as the monitoring target areas to the OS;
   when receiving a first notification indicating that the position of the computer has entered or has left the area indicated by the first area information from the OS, newly generating the first area information according to a position of the computer at a second time when the first notification is received;
   selecting new second area information from among the plurality of candidate area information based on a position of the computer at the second time; and
   resetting the new first area information and the new second area information as new monitoring target areas of the OS.

2. The storage medium according to claim 1, further comprising:
   when a second notification indicating that the position of the computer falls within the area indicated by the second area information is received from the OS, outputting information corresponding to the second area information.

3. The storage medium according to claim 2, wherein
   the generating includes newly generating the first area information according to a position of the computer at a third time when the second notification is received, and
   the selecting includes newly selecting the second area information from the plurality of candidate area information.

4. The storage medium according to claim 1,
   wherein the first area information corresponds to an area including the position of the computer at the first time.

5. The storage medium according to claim 4, wherein
   the first area information includes the position of the computer at the first time, and
   the generating includes generating the first area information based on a distance between the position of the computer and an area indicated by the second area information that is not selected at the first time.

6. The storage medium according to claim 1,
   wherein the first area information corresponds to an area that does not include the position of the computer at the first time, the area being generated away from the position of the computer at the first time by a predetermined distance.

7. The storage medium according to claim 6,
   wherein the generating includes generating the first area information based on a distance between the position of the computer and an area indicated by the second area information that is not selected at the first time.

8. The storage medium according to claim 1,
   wherein the generating includes generating the first area information based on at least one of a moving speed of the computer and a moving direction of the computer.

9. A control method executed by a processor of an information processing apparatus installing an operating system (OS) for monitoring entry into or leaving from a monitoring target area, the control method comprising:
   generating first area information according to a position of the computer at a first time;
   selecting second area information from a plurality of predefined candidate area information based on the position of the computer at the first time, the second area information being less than a maximum number of the monitoring target areas set to the OS by the number of the first area information or more;
   setting the first area information and the second area information as the monitoring target areas to the OS;
   when receiving a first notification indicating that the position of the computer has entered or has left the area indicated by the first area information from the OS, newly generating the first area information according to a position of the computer at a second time when the first notification is received;

selecting new second area information from the plurality of candidate area information based on a position of the computer at the second time; and resetting the new first area information and the new second area information as new monitoring target areas of the OS.

10. A control apparatus, comprising:

a memory; and a processor coupled to the memory and configured to:

generate first area information according to a position of the computer at a first time;

select second area information from a plurality of predefined candidate area information based on the position of the computer at the first time, the second area information being less than a maximum number of the monitoring target areas set to an operating system (OS) by the number of the first area information or more;

set the first area information and the second area information as the monitoring target areas to the OS;

when receiving a first notification indicating that the position of the computer has entered or has left the area indicated by the first area information from the OS, newly generate the first area information according to a position of the computer at a second time when the first notification is received;

select new second area information from the plurality of candidate area information based on the position of the computer at the second time; and reset the new first area information and the new second area information as new monitoring target areas of the OS.

11. The control apparatus according to claim 10, wherein the processor is configured to when a second notification indicating that the position of the computer falls within the area indicated by the second area information is received from the OS, output information corresponding to the second area information.

12. The control apparatus according to claim 11, wherein the processor is configured to:

newly generate the first area information according to a position of the computer at a third time when the second notification is received, and newly select the second area information from the plurality of candidate area information.

13. The control apparatus according to claim 10, wherein the first area information corresponds to an area including the position of the computer at the first time.

14. The control apparatus according to claim 13, wherein the first area information includes the position of the computer at the first time, and the processor is configured to generate the first area information based on a distance between the position of the computer and an area indicated by the second area information that is not selected at the first time.

* * * * *